US010778765B2

(12) United States Patent
Metz et al.

(10) Patent No.: US 10,778,765 B2
(45) Date of Patent: Sep. 15, 2020

(54) BID/ASK PROTOCOL IN SCALE-OUT NVME STORAGE

(71) Applicant: CISCO TECHNOLOGY, INC., San Jose, CA (US)

(72) Inventors: J. Michel Metz, San Jose, CA (US); Joseph E. Pelissier, Hillsboro, OR (US)

(73) Assignee: CISCO TECHNOLOGY, INC., San Jose, CA (US)

(*) Notice: Subject to any disclaimer, the term of this patent is extended or adjusted under 35 U.S.C. 154(b) by 181 days.

(21) Appl. No.: 15/097,126

(22) Filed: Apr. 12, 2016

(65) Prior Publication Data
US 2017/0019475 A1    Jan. 19, 2017

Related U.S. Application Data

(60) Provisional application No. 62/192,966, filed on Jul. 15, 2015.

(51) Int. Cl.
*H04L 29/08* (2006.01)
*G06F 3/06* (2006.01)

(52) U.S. Cl.
CPC ........ *H04L 67/1097* (2013.01); *G06F 3/0607* (2013.01); *G06F 3/067* (2013.01);
(Continued)

(58) Field of Classification Search
CPC ....... H04L 5/0058; H04L 5/14; H04L 5/1423; H04L 5/16; H04L 47/10; H04L 47/30;
(Continued)

(56) References Cited

U.S. PATENT DOCUMENTS 4,688,695 A    8/1987  Hirohata
5,263,003 A   11/1993  Cowles et al.
(Continued)

FOREIGN PATENT DOCUMENTS

EP    2228719    9/2010
EP    2439637    4/2012
(Continued)

OTHER PUBLICATIONS

PCT dated Aug. 31, 2016 International Search Report and Written Opinion of the International Searching Authority from International Application Serial No. PCT/US2016/038403; 13 pages.
(Continued)

*Primary Examiner* — Djenane M Bayard
(74) *Attorney, Agent, or Firm* — Polsinelli PC

(57) ABSTRACT

A method is provided in one example embodiment and includes receiving by first network device a request for storage resources from a second network device; evaluating a willingness of the first network device to provide the requested storage resources and assigning a willingness score based on the evaluating; determining whether the willingness score is greater than a minimum value; and if the willingness score is greater than the minimum value, providing a response to the request from the first network device to the second network device, wherein the response comprises a bid by the first network device to provide the requested storage resources to the second network device.

18 Claims, 5 Drawing Sheets

(52) U.S. Cl.
CPC ........ *G06F 3/0631* (2013.01); *H04L 67/1012* (2013.01); *H04L 67/1095* (2013.01)

(58) Field of Classification Search
CPC ............. H04L 12/2854; H04L 67/1095; H04L 67/325; H04L 41/0806; H04L 41/0893; H04L 45/22; H04L 67/1097; H04L 63/20; H04L 47/70; H04L 67/10; H04L 63/1433; H04L 43/16; H04L 41/147; H04L 43/0876; H04L 63/104; H04L 41/0816; H04L 41/5003; H04L 43/0817; H04L 43/50; H04L 69/08; H04L 67/06; H04L 67/1008; H04L 67/303; H04L 67/34; H04L 1/16; H04L 41/0896; H04L 41/145; H04L 43/08; H04L 47/762; H04L 47/781; H04L 47/828; H04L 69/40; H04L 67/42; H04L 67/32; H04L 41/046; H04L 43/10; H04L 51/16; H04L 51/22; H04L 67/025; H04L 67/12; H04L 67/125; H04L 67/2842; H04L 41/00; H04L 41/0659; H04L 41/0873; H04L 43/0852; H04L 43/0882; H04L 43/12; H04L 47/27; H04L 47/365; H04L 51/046; H04L 51/12; H04L 51/18; H04L 51/26; H04L 63/0428; H04L 63/0823; H04L 63/102; H04L 63/1425; H04L 63/145; H04L 63/1466; H04L 65/602; H04L 67/1074; H04L 67/22; H04L 67/28; H04L 67/306; H04L 69/22

See application file for complete search history.

(56) References Cited

U.S. PATENT DOCUMENTS

| | | |
|---|---|---|
| 5,339,445 A | 8/1994 | Gasztonyi |
| 5,430,859 A | 7/1995 | Norman et al. |
| 5,457,746 A | 10/1995 | Dolphin |
| 5,535,336 A | 7/1996 | Smith et al. |
| 5,588,012 A | 12/1996 | Oizumi |
| 5,617,421 A | 4/1997 | Chin et al. |
| 5,680,579 A | 10/1997 | Young et al. |
| 5,690,194 A | 11/1997 | Parker et al. |
| 5,740,171 A | 4/1998 | Mazzola et al. |
| 5,742,604 A | 4/1998 | Edsall et al. |
| 5,764,636 A | 6/1998 | Edsall |
| 5,809,285 A | 9/1998 | Hilland |
| 5,812,814 A | 9/1998 | Sukegawa |
| 5,812,950 A | 9/1998 | Tom |
| 5,838,970 A | 11/1998 | Thomas |
| 5,999,930 A | 12/1999 | Wolff |
| 6,035,105 A | 3/2000 | McCloghrie et al. |
| 6,101,497 A | 8/2000 | Ofek |
| 6,148,414 A | 11/2000 | Brown et al. |
| 6,185,203 B1 | 2/2001 | Berman |
| 6,188,694 B1 | 2/2001 | Fine et al. |
| 6,202,135 B1 | 3/2001 | Kedem et al. |
| 6,208,649 B1 | 3/2001 | Kloth |
| 6,209,059 B1 | 3/2001 | Ofer et al. |
| 6,219,699 B1 | 4/2001 | McCloghrie et al. |
| 6,219,753 B1 | 4/2001 | Richardson |
| 6,223,250 B1 | 4/2001 | Yokono |
| 6,226,771 B1 | 5/2001 | Hilla et al. |
| 6,260,120 B1 | 7/2001 | Blumenau et al. |
| 6,266,705 B1 | 7/2001 | Ullum et al. |
| 6,269,381 B1 | 7/2001 | St Pierre et al. |
| 6,269,431 B1 | 7/2001 | Dunham |
| 6,295,575 B1 | 9/2001 | Blumenau et al. |
| 6,400,730 B1 | 6/2002 | Latif et al. |
| 6,408,406 B1 | 6/2002 | Parris |
| 6,542,909 B1 | 4/2003 | Tamer et al. |
| 6,542,961 B1 | 4/2003 | Matsunami et al. |
| 6,553,390 B1 | 4/2003 | Gross et al. |
| 6,564,252 B1 | 5/2003 | Hickman et al. |
| 6,647,474 B2 | 11/2003 | Yanai et al. |
| 6,675,258 B1 | 1/2004 | Bramhall et al. |
| 6,683,883 B1 | 1/2004 | Czeiger et al. |
| 6,694,413 B1 | 2/2004 | Mimatsu et al. |
| 6,708,227 B1 | 3/2004 | Cabrera et al. |
| 6,715,007 B1 | 3/2004 | Williams et al. |
| 6,728,791 B1 | 4/2004 | Young |
| 6,772,231 B2 | 8/2004 | Reuter et al. |
| 6,820,099 B1 | 11/2004 | Huber et al. |
| 6,847,647 B1 | 1/2005 | Wrenn |
| 6,848,759 B2 | 2/2005 | Doornbos et al. |
| 6,850,955 B2 | 2/2005 | Sonoda et al. |
| 6,876,656 B2 | 4/2005 | Brewer et al. |
| 6,880,062 B1 | 4/2005 | Ibrahim et al. |
| 6,898,670 B2 | 5/2005 | Nahum |
| 6,907,419 B1 | 6/2005 | Pesola et al. |
| 6,912,668 B1 | 6/2005 | Brown et al. |
| 6,952,734 B1 | 10/2005 | Gunlock et al. |
| 6,976,090 B2 | 12/2005 | Ben-Shaul et al. |
| 6,978,300 B1 | 12/2005 | Beukema et al. |
| 6,983,303 B2 | 1/2006 | Pellegrino et al. |
| 6,986,015 B2 | 1/2006 | Testardi |
| 6,986,069 B2 | 1/2006 | Oehler et al. |
| 7,051,056 B2 | 5/2006 | Rodriguez-Rivera et al. |
| 7,069,465 B2 | 6/2006 | Chu et al. |
| 7,073,017 B2 | 7/2006 | Yamamoto |
| 7,108,339 B2 | 9/2006 | Berger |
| 7,149,858 B1 | 12/2006 | Kiselev |
| 7,171,514 B2 | 1/2007 | Coronado et al. |
| 7,171,668 B2 | 1/2007 | Molloy et al. |
| 7,174,354 B2 | 2/2007 | Andreasson |
| 7,200,144 B2 | 4/2007 | Terrell et al. |
| 7,222,255 B1 | 5/2007 | Claessens et al. |
| 7,237,045 B2 | 6/2007 | Beckmann et al. |
| 7,240,188 B2 | 7/2007 | Takata et al. |
| 7,246,260 B2 | 7/2007 | Brown et al. |
| 7,266,718 B2 | 9/2007 | Idei et al. |
| 7,269,168 B2 | 9/2007 | Roy et al. |
| 7,277,431 B2 | 10/2007 | Walter et al. |
| 7,277,948 B2 | 10/2007 | Igarashi et al. |
| 7,305,658 B1 | 12/2007 | Hamilton et al. |
| 7,328,434 B2 | 2/2008 | Swanson et al. |
| 7,340,555 B2 | 3/2008 | Ashmore et al. |
| 7,346,751 B2 | 3/2008 | Prahlad et al. |
| 7,352,706 B2 | 4/2008 | Klotz et al. |
| 7,353,305 B2 | 4/2008 | Pangal et al. |
| 7,359,321 B1 | 4/2008 | Sindhu et al. |
| 7,383,381 B1 | 6/2008 | Faulkner et al. |
| 7,433,326 B2 | 10/2008 | Desai et al. |
| 7,433,948 B2 | 10/2008 | Edsall |
| 7,434,105 B1 | 10/2008 | Rodriguez-Rivera et al. |
| 7,441,154 B2 | 10/2008 | Klotz et al. |
| 7,447,839 B2 | 11/2008 | Uppala |
| 7,487,321 B2 | 2/2009 | Muthiah et al. |
| 7,500,053 B1 | 3/2009 | Kavuri et al. |
| 7,542,681 B2 | 6/2009 | Cornell et al. |
| 7,558,872 B1 | 7/2009 | Senevirathne et al. |
| 7,587,570 B2 | 9/2009 | Sarkar et al. |
| 7,643,505 B1 | 1/2010 | Colloff |
| 7,654,625 B2 | 2/2010 | Amann et al. |
| 7,657,796 B1 | 2/2010 | Kaiser et al. |
| 7,668,981 B1 | 2/2010 | Nagineni et al. |
| 7,669,071 B2 | 2/2010 | Cochran et al. |
| 7,689,384 B1 | 3/2010 | Becker |
| 7,694,092 B2 | 4/2010 | Mizuno |
| 7,697,554 B1 | 4/2010 | Ofer et al. |
| 7,706,303 B2 | 4/2010 | Bose et al. |
| 7,707,481 B2 | 4/2010 | Kirschner et al. |
| 7,716,648 B2 | 5/2010 | Vaidyanathan et al. |
| 7,752,360 B2 | 7/2010 | Galles |
| 7,757,059 B1 | 7/2010 | Ofer et al. |
| 7,774,329 B1 | 8/2010 | Peddy et al. |
| 7,774,839 B2 | 8/2010 | Nazzal |
| 7,793,138 B2 | 9/2010 | Rastogi et al. |
| 7,840,730 B2 | 11/2010 | D'Amato et al. |
| 7,843,906 B1 | 11/2010 | Chidambaram et al. |
| 7,895,428 B2 | 2/2011 | Boland, IV et al. |
| 7,904,599 B1 | 3/2011 | Bennett |

(56) References Cited

U.S. PATENT DOCUMENTS

| | | |
|---|---|---|
| 7,930,494 B1 | 4/2011 | Goheer et al. |
| 7,975,175 B2 | 7/2011 | Votta et al. |
| 7,979,670 B2 | 7/2011 | Saliba et al. |
| 7,984,259 B1 | 7/2011 | English |
| 8,031,703 B2 | 10/2011 | Gottumukkula et al. |
| 8,032,621 B1 | 10/2011 | Upalekar et al. |
| 8,051,197 B2 | 11/2011 | Mullendore et al. |
| 8,086,755 B2 | 12/2011 | Duffy, IV et al. |
| 8,161,134 B2 | 4/2012 | Mishra et al. |
| 8,196,018 B2 | 6/2012 | Forhan et al. |
| 8,205,951 B2 | 6/2012 | Boks |
| 8,218,538 B1 | 7/2012 | Chidambaram et al. |
| 8,230,066 B2 | 7/2012 | Heil |
| 8,234,377 B2 | 7/2012 | Cohn |
| 8,266,238 B2 | 9/2012 | Zimmer et al. |
| 8,272,104 B2 | 9/2012 | Chen et al. |
| 8,274,993 B2 | 9/2012 | Sharma et al. |
| 8,290,919 B1 | 10/2012 | Kelly et al. |
| 8,297,722 B2 | 10/2012 | Chambers et al. |
| 8,301,746 B2 | 10/2012 | Head et al. |
| 8,335,231 B2 | 12/2012 | Kloth et al. |
| 8,341,121 B1 | 12/2012 | Claudatos et al. |
| 8,345,692 B2 | 1/2013 | Smith |
| 8,352,941 B1 | 1/2013 | Protopopov et al. |
| 8,392,760 B2 | 3/2013 | Kandula, Sr. et al. |
| 8,442,059 B1 | 5/2013 | de la Iglesia et al. |
| 8,479,211 B1 | 7/2013 | Marshall et al. |
| 8,495,356 B2 | 7/2013 | Ashok et al. |
| 8,514,868 B2 | 8/2013 | Hill |
| 8,532,108 B2 | 9/2013 | Li et al. |
| 8,560,663 B2 | 10/2013 | Baucke et al. |
| 8,619,599 B1 | 12/2013 | Even |
| 8,626,891 B2 | 1/2014 | Guru et al. |
| 8,630,983 B2 | 1/2014 | Sengupta et al. |
| 8,660,129 B1 | 2/2014 | Brendel et al. |
| 8,661,299 B1 | 2/2014 | Ip |
| 8,677,485 B2 | 3/2014 | Sharma et al. |
| 8,683,296 B2 | 3/2014 | Anderson et al. |
| 8,706,772 B2 | 4/2014 | Hartig et al. |
| 8,719,804 B2 | 5/2014 | Jain |
| 8,725,854 B2 | 5/2014 | Edsall |
| 8,768,981 B1 | 7/2014 | Milne et al. |
| 8,775,773 B2 | 7/2014 | Acharya et al. |
| 8,793,372 B2 | 7/2014 | Ashok et al. |
| 8,805,918 B1 | 8/2014 | Chandrasekaran et al. |
| 8,805,951 B1 | 8/2014 | Faibish et al. |
| 8,832,330 B1 | 9/2014 | Lancaster |
| 8,855,116 B2 | 10/2014 | Rosset et al. |
| 8,856,339 B2 | 10/2014 | Mestery et al. |
| 8,868,474 B2 | 10/2014 | Leung et al. |
| 8,887,286 B2 | 11/2014 | Dupont et al. |
| 8,898,385 B2 | 11/2014 | Jayaraman et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,935,500 B1 | 1/2015 | Gulati et al. |
| 8,949,677 B1 | 2/2015 | Brundage et al. |
| 8,996,837 B1 | 3/2015 | Bono et al. |
| 9,003,086 B1 | 4/2015 | Schuller et al. |
| 9,007,922 B1 | 4/2015 | Mittal et al. |
| 9,009,427 B2 | 4/2015 | Sharma et al. |
| 9,009,704 B2 | 4/2015 | McGrath et al. |
| 9,075,638 B2 | 7/2015 | Barnett et al. |
| 9,141,554 B1 | 9/2015 | Candelaria |
| 9,141,785 B2 | 9/2015 | Mukkara et al. |
| 9,164,795 B1 | 10/2015 | Vincent |
| 9,176,677 B1 | 11/2015 | Fradkin et al. |
| 9,201,704 B2 | 12/2015 | Chang et al. |
| 9,203,784 B2 | 12/2015 | Chang et al. |
| 9,207,882 B2 | 12/2015 | Rosset et al. |
| 9,207,929 B2 | 12/2015 | Katsura |
| 9,213,612 B2 | 12/2015 | Candelaria |
| 9,223,564 B2 | 12/2015 | Munireddy et al. |
| 9,223,634 B2 | 12/2015 | Chang et al. |
| 9,244,761 B2 | 1/2016 | Yekhanin et al. |
| 9,250,969 B2 | 2/2016 | Lager-Cavilla et al. |
| 9,264,494 B2 | 2/2016 | Factor et al. |
| 9,270,754 B2 | 2/2016 | Iyengar et al. |
| 9,280,487 B2 | 3/2016 | Candelaria |
| 9,304,815 B1 | 4/2016 | Vasanth et al. |
| 9,313,048 B2 | 4/2016 | Chang et al. |
| 9,374,270 B2 | 6/2016 | Nakil et al. |
| 9,378,060 B2 | 6/2016 | Jansson et al. |
| 9,396,251 B1 | 7/2016 | Boudreau et al. |
| 9,448,877 B2 | 9/2016 | Candelaria |
| 9,471,348 B2 | 10/2016 | Zuo et al. |
| 9,501,473 B1* | 11/2016 | Kong ..................... G06F 12/00 |
| 9,503,523 B2 | 11/2016 | Rosset et al. |
| 9,565,110 B2 | 2/2017 | Mullendore et al. |
| 9,575,828 B2 | 2/2017 | Agarwal et al. |
| 9,614,763 B2 | 4/2017 | Dong et al. |
| 9,658,868 B2 | 5/2017 | Hill |
| 9,658,876 B2 | 5/2017 | Chang et al. |
| 9,733,868 B2 | 8/2017 | Chandrasekaran et al. |
| 9,763,518 B2 | 9/2017 | Charest et al. |
| 9,830,240 B2 | 11/2017 | George et al. |
| 9,853,873 B2 | 12/2017 | Dasu et al. |
| 2002/0049980 A1 | 4/2002 | Hoang |
| 2002/0053009 A1 | 5/2002 | Selkirk et al. |
| 2002/0073276 A1 | 6/2002 | Howard et al. |
| 2002/0083120 A1 | 6/2002 | Soltis |
| 2002/0095547 A1 | 7/2002 | Watanabe et al. |
| 2002/0103889 A1 | 8/2002 | Markson et al. |
| 2002/0103943 A1 | 8/2002 | Lo et al. |
| 2002/0103969 A1* | 8/2002 | Koizumi ............... G06F 3/0605 711/114 |
| 2002/0112113 A1 | 8/2002 | Karpoff et al. |
| 2002/0120741 A1 | 8/2002 | Webb et al. |
| 2002/0138675 A1 | 9/2002 | Mann |
| 2002/0156971 A1 | 10/2002 | Jones et al. |
| 2003/0023885 A1 | 1/2003 | Potter et al. |
| 2003/0026267 A1 | 2/2003 | Oberman et al. |
| 2003/0055933 A1 | 3/2003 | Ishizaki et al. |
| 2003/0056126 A1 | 3/2003 | O'Connor et al. |
| 2003/0065986 A1 | 4/2003 | Fraenkel et al. |
| 2003/0084359 A1 | 5/2003 | Bresniker et al. |
| 2003/0118053 A1 | 6/2003 | Edsall et al. |
| 2003/0131105 A1 | 7/2003 | Czeiger et al. |
| 2003/0131165 A1 | 7/2003 | Asano et al. |
| 2003/0131182 A1 | 7/2003 | Kumar et al. |
| 2003/0140134 A1 | 7/2003 | Swanson et al. |
| 2003/0140210 A1 | 7/2003 | Testardi |
| 2003/0149763 A1 | 8/2003 | Heitman et al. |
| 2003/0154271 A1 | 8/2003 | Baldwin et al. |
| 2003/0159058 A1 | 8/2003 | Eguchi et al. |
| 2003/0174725 A1 | 9/2003 | Shankar |
| 2003/0189395 A1 | 10/2003 | Doornbos et al. |
| 2003/0210686 A1 | 11/2003 | Terrell et al. |
| 2004/0024961 A1 | 2/2004 | Cochran et al. |
| 2004/0030857 A1 | 2/2004 | Krakirian et al. |
| 2004/0039939 A1 | 2/2004 | Cox et al. |
| 2004/0054776 A1 | 3/2004 | Klotz et al. |
| 2004/0057389 A1 | 3/2004 | Klotz et al. |
| 2004/0059807 A1 | 3/2004 | Klotz et al. |
| 2004/0088574 A1 | 5/2004 | Walter et al. |
| 2004/0117438 A1 | 6/2004 | Considine et al. |
| 2004/0123029 A1 | 6/2004 | Dalal et al. |
| 2004/0128470 A1 | 7/2004 | Hetzler et al. |
| 2004/0153863 A1 | 8/2004 | Klotz et al. |
| 2004/0215749 A1 | 10/2004 | Tsao |
| 2004/0230848 A1 | 11/2004 | Mayo et al. |
| 2004/0250034 A1 | 12/2004 | Yagawa et al. |
| 2005/0033936 A1 | 2/2005 | Nakano et al. |
| 2005/0036499 A1 | 2/2005 | Dutt et al. |
| 2005/0050211 A1 | 3/2005 | Kaul et al. |
| 2005/0050270 A1 | 3/2005 | Horn et al. |
| 2005/0053073 A1 | 3/2005 | Kloth et al. |
| 2005/0055428 A1 | 3/2005 | Terai et al. |
| 2005/0060574 A1 | 3/2005 | Klotz et al. |
| 2005/0060598 A1 | 3/2005 | Klotz et al. |
| 2005/0071851 A1 | 3/2005 | Opheim |
| 2005/0076113 A1 | 4/2005 | Klotz et al. |
| 2005/0091426 A1 | 4/2005 | Horn et al. |

(56) References Cited

U.S. PATENT DOCUMENTS

| | | |
|---|---|---|
| 2005/0114615 A1 | 5/2005 | Ogasawara et al. |
| 2005/0117522 A1 | 6/2005 | Basavaiah et al. |
| 2005/0117562 A1 | 6/2005 | Wrenn |
| 2005/0138287 A1 | 6/2005 | Ogasawara et al. |
| 2005/0185597 A1 | 8/2005 | Le et al. |
| 2005/0188170 A1 | 8/2005 | Yamamoto |
| 2005/0235072 A1 | 10/2005 | Smith et al. |
| 2005/0283658 A1 | 12/2005 | Clark et al. |
| 2006/0015861 A1 | 1/2006 | Takata et al. |
| 2006/0015928 A1 | 1/2006 | Setty et al. |
| 2006/0034302 A1 | 2/2006 | Peterson |
| 2006/0045021 A1 | 3/2006 | Deragon et al. |
| 2006/0098672 A1 | 5/2006 | Schzukin et al. |
| 2006/0117099 A1 | 6/2006 | Mogul |
| 2006/0136684 A1 | 6/2006 | Le et al. |
| 2006/0184287 A1 | 8/2006 | Belady et al. |
| 2006/0198319 A1 | 9/2006 | Schondelmayer et al. |
| 2006/0215297 A1 | 9/2006 | Kikuchi |
| 2006/0230227 A1 | 10/2006 | Ogasawara et al. |
| 2006/0242332 A1 | 10/2006 | Johnsen et al. |
| 2006/0251111 A1 | 11/2006 | Kloth et al. |
| 2007/0005297 A1 | 1/2007 | Beresniewicz et al. |
| 2007/0067593 A1 | 3/2007 | Satoyama et al. |
| 2007/0079068 A1 | 4/2007 | Draggon |
| 2007/0094465 A1 | 4/2007 | Sharma et al. |
| 2007/0101202 A1 | 5/2007 | Garbow |
| 2007/0121519 A1 | 5/2007 | Cuni et al. |
| 2007/0136541 A1 | 6/2007 | Herz et al. |
| 2007/0162969 A1 | 7/2007 | Becker |
| 2007/0211640 A1 | 9/2007 | Palacharla et al. |
| 2007/0214316 A1 | 9/2007 | Kim |
| 2007/0250838 A1 | 10/2007 | Belady et al. |
| 2007/0263545 A1 | 11/2007 | Foster et al. |
| 2007/0276884 A1 | 11/2007 | Hara et al. |
| 2007/0283059 A1 | 12/2007 | Ho et al. |
| 2008/0016412 A1 | 1/2008 | White et al. |
| 2008/0034149 A1 | 2/2008 | Sheen |
| 2008/0052459 A1 | 2/2008 | Chang et al. |
| 2008/0059698 A1 | 3/2008 | Kabir et al. |
| 2008/0114933 A1 | 5/2008 | Ogasawara et al. |
| 2008/0126509 A1 | 5/2008 | Subramanian et al. |
| 2008/0126734 A1 | 5/2008 | Murase |
| 2008/0168304 A1 | 7/2008 | Flynn et al. |
| 2008/0201616 A1 | 8/2008 | Ashmore |
| 2008/0244184 A1 | 10/2008 | Lewis et al. |
| 2008/0256082 A1 | 10/2008 | Davies et al. |
| 2008/0267217 A1 | 10/2008 | Colville et al. |
| 2008/0288661 A1 | 11/2008 | Galles |
| 2008/0294888 A1 | 11/2008 | Ando et al. |
| 2009/0063766 A1 | 3/2009 | Matsumura et al. |
| 2009/0083484 A1 | 3/2009 | Basham et al. |
| 2009/0089567 A1 | 4/2009 | Boland, IV et al. |
| 2009/0094380 A1 | 4/2009 | Qiu et al. |
| 2009/0094664 A1 | 4/2009 | Butler et al. |
| 2009/0125694 A1 | 5/2009 | Innan et al. |
| 2009/0193223 A1 | 7/2009 | Saliba et al. |
| 2009/0201926 A1 | 8/2009 | Kagan et al. |
| 2009/0222733 A1 | 9/2009 | Basham et al. |
| 2009/0240873 A1 | 9/2009 | Yu et al. |
| 2009/0282471 A1 | 11/2009 | Green et al. |
| 2009/0323706 A1 | 12/2009 | Germain et al. |
| 2010/0011365 A1* | 1/2010 | Gerovac .............. G06F 9/5083 718/104 |
| 2010/0030995 A1 | 2/2010 | Wang et al. |
| 2010/0046378 A1 | 2/2010 | Knapp et al. |
| 2010/0083055 A1 | 4/2010 | Ozonat |
| 2010/0174968 A1 | 7/2010 | Charles et al. |
| 2010/0318609 A1 | 12/2010 | Lahiri et al. |
| 2010/0318837 A1 | 12/2010 | Murphy et al. |
| 2011/0010394 A1 | 1/2011 | Carew et al. |
| 2011/0022691 A1 | 1/2011 | Banerjee et al. |
| 2011/0029824 A1 | 2/2011 | Schöler et al. |
| 2011/0035494 A1 | 2/2011 | Pandey et al. |
| 2011/0075667 A1 | 3/2011 | Li et al. |
| 2011/0087848 A1 | 4/2011 | Trent |
| 2011/0119556 A1 | 5/2011 | de Buen |
| 2011/0142053 A1 | 6/2011 | Van Der Merwe et al. |
| 2011/0161496 A1* | 6/2011 | Nicklin .................. G06Q 30/06 709/226 |
| 2011/0173303 A1 | 7/2011 | Rider |
| 2011/0228679 A1 | 9/2011 | Varma et al. |
| 2011/0231899 A1 | 9/2011 | Pulier et al. |
| 2011/0239039 A1 | 9/2011 | Dieffenbach et al. |
| 2011/0252274 A1 | 10/2011 | Kawaguchi et al. |
| 2011/0276584 A1 | 11/2011 | Cotner et al. |
| 2011/0276675 A1 | 11/2011 | Singh et al. |
| 2011/0276951 A1 | 11/2011 | Jain |
| 2011/0299539 A1 | 12/2011 | Rajagopal et al. |
| 2011/0307450 A1 | 12/2011 | Hahn et al. |
| 2011/0313973 A1 | 12/2011 | Srivas et al. |
| 2012/0023319 A1 | 1/2012 | Chin et al. |
| 2012/0030401 A1 | 2/2012 | Cowan et al. |
| 2012/0054367 A1 | 3/2012 | Ramakrishnan et al. |
| 2012/0072578 A1 | 3/2012 | Alam |
| 2012/0072985 A1 | 3/2012 | Davne et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0130874 A1 | 5/2012 | Mane et al. |
| 2012/0131174 A1 | 5/2012 | Ferris et al. |
| 2012/0134672 A1 | 5/2012 | Banerjee |
| 2012/0144014 A1 | 6/2012 | Natham et al. |
| 2012/0167094 A1 | 6/2012 | Suit |
| 2012/0173581 A1 | 7/2012 | Hartig et al. |
| 2012/0173589 A1 | 7/2012 | Kwon et al. |
| 2012/0177039 A1 | 7/2012 | Berman |
| 2012/0177041 A1 | 7/2012 | Berman |
| 2012/0177042 A1 | 7/2012 | Berman |
| 2012/0177043 A1 | 7/2012 | Berman |
| 2012/0177044 A1 | 7/2012 | Berman |
| 2012/0177045 A1 | 7/2012 | Berman |
| 2012/0177370 A1 | 7/2012 | Berman |
| 2012/0179909 A1 | 7/2012 | Sagi et al. |
| 2012/0210041 A1 | 8/2012 | Flynn et al. |
| 2012/0254440 A1 | 10/2012 | Wang |
| 2012/0265976 A1 | 10/2012 | Spiers et al. |
| 2012/0281706 A1 | 11/2012 | Agarwal et al. |
| 2012/0297088 A1 | 11/2012 | Wang et al. |
| 2012/0303618 A1 | 11/2012 | Dutta et al. |
| 2012/0311106 A1 | 12/2012 | Morgan |
| 2012/0311568 A1 | 12/2012 | Jansen |
| 2012/0320788 A1 | 12/2012 | Venkataramanan et al. |
| 2012/0324114 A1 | 12/2012 | Dutta et al. |
| 2012/0331119 A1 | 12/2012 | Bose et al. |
| 2013/0003737 A1 | 1/2013 | Sinicrope |
| 2013/0013664 A1 | 1/2013 | Baird et al. |
| 2013/0028135 A1 | 1/2013 | Berman |
| 2013/0036212 A1 | 2/2013 | Jibbe et al. |
| 2013/0036213 A1 | 2/2013 | Hasan et al. |
| 2013/0036449 A1 | 2/2013 | Mukkara et al. |
| 2013/0054888 A1 | 2/2013 | Bhat et al. |
| 2013/0061089 A1 | 3/2013 | Valiyaparambil et al. |
| 2013/0067162 A1 | 3/2013 | Jayaraman et al. |
| 2013/0080823 A1 | 3/2013 | Roth et al. |
| 2013/0086340 A1 | 4/2013 | Fleming et al. |
| 2013/0100858 A1 | 4/2013 | Kamath et al. |
| 2013/0111540 A1 | 5/2013 | Sabin |
| 2013/0138816 A1 | 5/2013 | Kuo et al. |
| 2013/0138836 A1 | 5/2013 | Cohen et al. |
| 2013/0139138 A1 | 5/2013 | Kakos |
| 2013/0144933 A1* | 6/2013 | Hinni ...................... H04L 67/16 709/202 |
| 2013/0152076 A1 | 6/2013 | Patel |
| 2013/0152175 A1 | 6/2013 | Hromoko et al. |
| 2013/0163426 A1 | 6/2013 | Beliveau et al. |
| 2013/0163606 A1 | 6/2013 | Bagepalli et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198730 A1 | 8/2013 | Munireddy et al. |
| 2013/0204960 A1 | 8/2013 | Ashok et al. |
| 2013/0208888 A1 | 8/2013 | Agrawal et al. |
| 2013/0212130 A1 | 8/2013 | Rahnama |

(56) References Cited

U.S. PATENT DOCUMENTS

| | | |
|---|---|---|
| 2013/0238641 A1 | 9/2013 | Mandelstein et al. |
| 2013/0266307 A1 | 10/2013 | Garg et al. |
| 2013/0268922 A1 | 10/2013 | Tiwari et al. |
| 2013/0275470 A1 | 10/2013 | Cao et al. |
| 2013/0297655 A1 | 11/2013 | Narasayya et al. |
| 2013/0297769 A1 | 11/2013 | Chang et al. |
| 2013/0318134 A1* | 11/2013 | Bolik ............... G06F 9/5011 707/827 |
| 2013/0318288 A1 | 11/2013 | Khan et al. |
| 2014/0006708 A1 | 1/2014 | Huynh et al. |
| 2014/0016493 A1 | 1/2014 | Johnsson et al. |
| 2014/0019684 A1 | 1/2014 | Wei et al. |
| 2014/0025770 A1 | 1/2014 | Warfield et al. |
| 2014/0029441 A1 | 1/2014 | Nydell |
| 2014/0029442 A1 | 1/2014 | Wallman |
| 2014/0039683 A1 | 2/2014 | Zimmermann et al. |
| 2014/0040473 A1 | 2/2014 | Ho et al. |
| 2014/0040883 A1 | 2/2014 | Tompkins |
| 2014/0047201 A1 | 2/2014 | Mehta |
| 2014/0053264 A1 | 2/2014 | Dubrovsky et al. |
| 2014/0059187 A1 | 2/2014 | Rosset et al. |
| 2014/0059266 A1 | 2/2014 | Ben-Michael et al. |
| 2014/0086253 A1 | 3/2014 | Yong |
| 2014/0089273 A1 | 3/2014 | Borshack et al. |
| 2014/0096249 A1 | 4/2014 | Dupont et al. |
| 2014/0105009 A1 | 4/2014 | Vos et al. |
| 2014/0108474 A1 | 4/2014 | David et al. |
| 2014/0109071 A1 | 4/2014 | Ding et al. |
| 2014/0112122 A1 | 4/2014 | Kapadia et al. |
| 2014/0123207 A1 | 5/2014 | Agarwal et al. |
| 2014/0156557 A1 | 6/2014 | Zeng et al. |
| 2014/0164666 A1 | 6/2014 | Yand |
| 2014/0164866 A1 | 6/2014 | Bolotov et al. |
| 2014/0172371 A1 | 6/2014 | Zhu et al. |
| 2014/0173060 A1 | 6/2014 | Jubran et al. |
| 2014/0173195 A1 | 6/2014 | Rosset et al. |
| 2014/0173579 A1 | 6/2014 | McDonald et al. |
| 2014/0189278 A1 | 7/2014 | Peng |
| 2014/0198794 A1 | 7/2014 | Mehta et al. |
| 2014/0211661 A1 | 7/2014 | Gorkemli et al. |
| 2014/0215265 A1 | 7/2014 | Mohanta et al. |
| 2014/0215590 A1 | 7/2014 | Brand |
| 2014/0219086 A1 | 8/2014 | Cantu' et al. |
| 2014/0222953 A1 | 8/2014 | Karve et al. |
| 2014/0229790 A1 | 8/2014 | Goss et al. |
| 2014/0244585 A1 | 8/2014 | Sivasubramanian et al. |
| 2014/0244897 A1 | 8/2014 | Goss et al. |
| 2014/0245435 A1 | 8/2014 | Belenky |
| 2014/0269390 A1 | 9/2014 | Ciodaru et al. |
| 2014/0281700 A1 | 9/2014 | Nagesharao et al. |
| 2014/0297941 A1 | 10/2014 | Rajani et al. |
| 2014/0307578 A1 | 10/2014 | DeSanti |
| 2014/0317206 A1 | 10/2014 | Lomelino et al. |
| 2014/0324862 A1 | 10/2014 | Bingham et al. |
| 2014/0325208 A1 | 10/2014 | Resch et al. |
| 2014/0331276 A1* | 11/2014 | Frascadore ............ H04L 63/20 726/1 |
| 2014/0348166 A1 | 11/2014 | Yang et al. |
| 2014/0355450 A1 | 12/2014 | Bhikkaji et al. |
| 2014/0366155 A1 | 12/2014 | Chang et al. |
| 2015/0003450 A1 | 1/2015 | Salam et al. |
| 2015/0003458 A1 | 1/2015 | Li et al. |
| 2015/0003463 A1 | 1/2015 | Li et al. |
| 2015/0010001 A1 | 1/2015 | Duda et al. |
| 2015/0016461 A1 | 1/2015 | Qiang |
| 2015/0030024 A1 | 1/2015 | Venkataswami et al. |
| 2015/0046123 A1 | 2/2015 | Kato |
| 2015/0063353 A1 | 3/2015 | Kapadia et al. |
| 2015/0067001 A1 | 3/2015 | Koltsidas |
| 2015/0082432 A1 | 3/2015 | Eaton et al. |
| 2015/0120907 A1 | 4/2015 | Niestemski et al. |
| 2015/0121131 A1 | 4/2015 | Kiselev et al. |
| 2015/0127979 A1 | 5/2015 | Doppalapudi |
| 2015/0169313 A1 | 6/2015 | Katsura |
| 2015/0180672 A1 | 6/2015 | Kuwata |
| 2015/0207763 A1 | 6/2015 | Bertran Ortiz et al. |
| 2015/0205974 A1 | 7/2015 | Talley et al. |
| 2015/0222444 A1 | 8/2015 | Sarkar |
| 2015/0229546 A1 | 8/2015 | Somaiya et al. |
| 2015/0248366 A1 | 9/2015 | Bergsten et al. |
| 2015/0248418 A1 | 9/2015 | Bhardwaj et al. |
| 2015/0254003 A1 | 9/2015 | Lee et al. |
| 2015/0254088 A1 | 9/2015 | Chou et al. |
| 2015/0261446 A1 | 9/2015 | Lee |
| 2015/0263993 A1 | 9/2015 | Kuch et al. |
| 2015/0269048 A1* | 9/2015 | Marr .................... G06F 11/30 714/2 |
| 2015/0281067 A1 | 10/2015 | Wu |
| 2015/0303949 A1 | 10/2015 | Jafarkhani et al. |
| 2015/0341237 A1 | 11/2015 | Cuni et al. |
| 2015/0341239 A1 | 11/2015 | Bertran Ortiz et al. |
| 2015/0358136 A1 | 12/2015 | Medard |
| 2015/0379150 A1 | 12/2015 | Duda |
| 2016/0011936 A1 | 1/2016 | Luby |
| 2016/0011942 A1* | 1/2016 | Golbourn ............ G06F 9/5011 714/6.3 |
| 2016/0062820 A1 | 3/2016 | Jones et al. |
| 2016/0070652 A1 | 3/2016 | Sundararaman et al. |
| 2016/0087885 A1 | 3/2016 | Tripathi et al. |
| 2016/0088083 A1 | 3/2016 | Bharadwaj et al. |
| 2016/0119159 A1 | 4/2016 | Zhao et al. |
| 2016/0205189 A1 | 7/2016 | Mopur et al. |
| 2016/0210161 A1 | 7/2016 | Rosset et al. |
| 2016/0274926 A1 | 9/2016 | Narasimhamurthy et al. |
| 2016/0285760 A1 | 9/2016 | Dong |
| 2016/0292359 A1 | 10/2016 | Tellis et al. |
| 2016/0294983 A1 | 10/2016 | Kliteynik et al. |
| 2016/0334998 A1 | 11/2016 | George et al. |
| 2016/0366094 A1 | 12/2016 | Mason et al. |
| 2016/0378624 A1 | 12/2016 | Jenkins, Jr. et al. |
| 2016/0380694 A1 | 12/2016 | Guduru |
| 2017/0010874 A1 | 1/2017 | Rosset |
| 2017/0010930 A1 | 1/2017 | Dutta et al. |
| 2017/0068630 A1 | 3/2017 | Iskandar et al. |
| 2017/0168970 A1 | 6/2017 | Sajeepa et al. |
| 2017/0177860 A1 | 6/2017 | Suarez et al. |
| 2017/0212858 A1 | 7/2017 | Chu et al. |
| 2017/0277655 A1 | 9/2017 | Das et al. |
| 2017/0337097 A1 | 11/2017 | Sipos et al. |
| 2017/0340113 A1 | 11/2017 | Charest et al. |
| 2017/0371558 A1 | 12/2017 | George et al. |

FOREIGN PATENT DOCUMENTS

| | | |
|---|---|---|
| EP | 2680155 | 1/2014 |
| GB | 2350028 | 5/2001 |
| JP | 2000-242434 | 9/2000 |
| TW | 1566104 | 1/2017 |
| WO | WO 2004/077214 | 9/2004 |
| WO | WO 2016/003408 | 1/2016 |
| WO | WO 2016/003489 | 1/2016 |

OTHER PUBLICATIONS

Author Unknown, "5 Benefits of a Storage Gateway in the Cloud," Blog, TwinStrata, Inc., posted Jul. 10, 2012, 4 pages, https://web.archive.org/web/20120725092619/http://blog.teinstrata.com/2012/07/10//5-benefits-of-a-storage-gateway-in-the-cloud.

Author Unknown, "Configuration Interface for IBM System Storage DS5000, IBM DS4000, and IBM DS3000 Systems," IBM SAN Volume Controller Version 7.1, IBM® System Storage® SAN Volume Controller Information Center, Jun. 16, 2013, 3 pages.

Author Unknown, "Coraid EtherCloud, Software-Defined Storage with Scale-Out Infrastructure," Solution Brief, 2013, 2 pages, Coraid, Redwood City, California, U.S.A.

Author Unknown, "Coraid Virtual DAS (VDAS) Technology: Eliminate Tradeoffs between DAS and Networked Storage," Coraid Technology Brief, © 2013 Cora id, Inc., Published on or about Mar. 20, 2013, 2 pages.

Author Unknown, "Creating Performance-based SAN SLAs Using Finisar's NetWisdom" May 2006, 7 pages, Finisar Corporation, Sunnyvale, California, U.S.A.

(56) References Cited

OTHER PUBLICATIONS

Author Unknown, "Data Center, Metro Cloud Connectivity: Integrated Metro SAN Connectivity in 16 Gbps Switches," Brocade Communication Systems, Inc., Apr. 2011, 14 pages.
Author Unknown, "Data Center, SAN Fabric Administration Best Practices Guide, Support Perspective," Brocade Communication Systems, Inc., May 2013, 21 pages.
Author Unknown, "delphi—Save a CRC value in a file, without altering the actual CRC Checksum?" Stack Overflow, stackoverflow. com, Dec. 23, 2011, XP055130879, 3 pages http://stackoverflow.com/questions/8608219/save-a-crc-value-in-a-file-without-altering-the-actual-crc-checksum.
Author Unknown, "EMC UNISPHERE: Innovative Approach to Managing Low-End and Midrange Storage; Redefining Simplicity in the Entry-Level and Midrange Storage Markets," Data Sheet, EMC Corporation; published on or about Jan. 4, 2013 [Retrieved and printed Sep. 12, 2013] 6 pages http://www.emc.com/storage/vnx/unisphere.htm.
Author Unknown, "HP XP Array Manager Software—Overview & Features," Storage Device Management Software; Hewlett-Packard Development Company, 3 pages; © 2013 Hewlett-Packard Development Company, L.P.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "Network Transformation with Software-Defined Networking and Ethernet Fabrics," Positioning Paper, 2012, 6 pages, Brocade Communications Systems.
Author Unknown, "Recreating Real Application Traffic in Junosphere Lab," Solution Brief, Juniper Networks, Dec. 2011, 3 pages.
Author Unknown, "Shunra for HP Softwarer," Enabling Confidence in Application Performance Before Deployment, 2010, 2 pages.
Author Unknown, "Software Defined Networking: The New Norm for Networks," White Paper, Open Networking Foundation, Apr. 13, 2012, 12 pages.
Author Unknown, "Software Defined Storage Networks an Introduction," White Paper, Doc # 01-000030-001 Rev. A, Dec. 12, 2012, 8 pages; Jeda Networks, Newport Beach, California, U.S.A.
Author Unknown, "Standard RAID Levels," Wikipedia, the Free Encyclopedia, last updated Jul. 18, 2014, 7 pages.; http://en.wikipedia.org/wiki/Standard_RAID_levels.
Author Unknown, "Storage Infrastructure for the Cloud," Solution Brief, © 2012, 3 pages.; coraid, Redwood City, California, U.S.A.
Author Unknown, "Storage Area Network—NPIV: Emulex Virtual HBA and Brocade, Proven Interoperability and Proven Solution," Technical Brief, Apr. 2008, 4 pages, Emulex and Brocade Communications Systems.
Author Unknown, "The Fundamentals of Software-Defined Storage, Simplicity at Scale for Cloud-Architectures" Solution Brief, 2013, 3 pages; Coraid, Redwood City, California, U.S.A.
Author Unknown, "VirtualWisdom® San Performance Probe Family Models: Probe FC8, HD, and HD48," Virtual Instruments Data Sheet, Apr. 2014 Virtual Instruments. All Rights Reserved; 4 pages.
Author Unknown, "Xgig Analyzer: Quick Start Feature Guide 4.0," Feb. 2008, 24 pages, Finisar Corporation, Sunnyvale, California, U.S.A.
Author Unknown, "Sun Storage Common Array Manager Installation and Setup Guide," Software Installation and Setup Guide Version 6.7.x821-1362-10, Appendix D: Configuring In-Band Management, Sun Oracle; retrieved and printed Sep. 12, 2013, 15 pages.
Author Unknown, "VBlock Solution for SAP: Simplified Provisioning for Operation Efficiency," VCE White Paper, VCE—The Virtual Computing Environment Company, Aug. 2011, 11 pages.
Berman, Stuart, et al., "Start-Up Jeda Networks in Software Defined Storage Network Technology," Press Release, Feb. 25, 2013, 2 pages, http://www.storagenewsletter.com/news/startups/jeda-networks.

Borovick, Lucinda, et al., "White Paper, Architecting the Network for the Cloud," IDC Analyze the Future, Jan. 2011, pp. 1-8.
Chakrabarti, Kaushik, et al., "Locally Adaptive Dimensionality Reduction for Indexing Large Time Series Databases," ACM Transactions on Database Systems, vol. 27, No. 2, Jun. 2009, pp. 188-228.
Chandola, Varun, et al., "A Gaussian Process Based Online Change Detection Algorithm for Monitoring Periodic Time Series," Proceedings of the Eleventh SIAM International Conference on Data Mining, SDM 2011, Apr. 28-30, 2011, 12 pages.
Cisco Systems, Inc. "N-Port Virtualization in the Data Center," Cisco White Paper, Cisco Systems, Inc., Mar. 2008, 7 pages.
Cisco Systems, Inc., "Best Practices in Deploying Cisco Nexus 1000V Series Switches on Cisco UCS B and C Series Cisco UCS Manager Servers," White Paper, Cisco Systems, Inc., Apr. 2011, 36 pages.
Cisco Systems, Inc., "Cisco Prime Data Center Network Manager 6.1," At-a-Glance, © 2012, 3 pages.
Cisco Systems, Inc., "Cisco Prime Data Center Network Manager," Release 6.1 Data Sheet, © 2012, 10 pages.
Cisco Systems, Inc., "Cisco Unified Network Services: Overcome Obstacles to Cloud-Ready Deployments," White Paper, Cisco Systems, Inc., Jan. 2011, 6 pages.
Clarke, Alan, et al., "Open Data Center Alliance Usage: Virtual Machine (VM) Interoperability in a Hybrid Cloud Environment Rev. 1.2," Open Data Center Alliance, Inc., 2013, pp. 1-18.
Cummings, Roger, et al., Fibre Channel—Fabric Generic Requirements (FC-FG), Dec. 4, 1996, 33 pages, American National Standards Institute, Inc., New York, New York, U.S.A.
Farber, Franz, et al. "An In-Memory Database System for Multi-Tenant Applications," Proceedings of 14th Business, Technology and Web (BTW) Conference on Database Systems for Business, Technology, and Web, Feb. 28 to Mar. 4, 2011, 17 pages, University of Kaiserslautern, Germany.
Guo, Chang Jie, et al., "IBM Resarch Report: Data Integration and Composite Business Services, Part 3, Building a Multi-Tenant Data Tier with with [sic] Access Control and Security," RC24426 (C0711-037), Nov. 19, 2007, 20 pages, IBM.
Hatzieleftheriou, Andromachi, et al., "Host-side Filesystem Journaling for Durable Shared Storage," $13^{th}$ USENIX Conference on File and Storage Technologies (FAST '15), Feb. 16-19, 2015, 9 pages; https://www.usenix.org/system/files/conference/fast15/fast15-paper-hatzieleftheriou.pdf.
Hedayat, K., et al., "A Two-Way Active Measurement Protocol (TWAMP)," Network Working Group, RFC 5357, Oct. 2008, 26 pages.
Horn, C., et al., "Online anomaly detection with expert system feedback in social networks," 2011 IEEE International Conference on Acoustics, Speech and Signal Processing (ICASSP), May 22-27, 2011, 2 pages, Prague; [Abstract only].
Hosterman, Cody, et al., "Using EMC Symmetrix Storage inVMware vSph ere Environments," Version 8.0, $EMC^2$Techbooks, EMC Corporation; published on or about Jul. 8, 2008, 314 pages; [Retrieved and printed Sep. 12, 2013].
Hu, Yuchong, et al., "Cooperative Recovery of Distributed Storage Systems from Multiple Losses with Network Coding," University of Science & Technology of China, Feb. 2010, 9 pages.
Keogh, Eamonn, et al., "Dimensionality Reduction for Fast Similarity Search in Large Time Series Databases," KAIS Long Paper submitted May 16, 2000; 19 pages.
Kolyshkin, Kirill, "Virtualization in Linux," Sep. 1, 2006, pp. 1-5.
Kovar, Joseph F., "Startup Jeda Networks Takes SDN Approach to Storage Networks," CRN Press Release, Feb. 22, 2013, 1 page, http://www.crn.com/240149244/printablearticle.htm.
Lampson, Butler, W., et al., "Crash Recovery in a Distributed Data Storage System," Jun. 1, 1979, 28 pages.
Lewis, Michael E., et al., "Design of an Advanced Development Model Optical Disk-Based Redundant Array of Independent Disks (RAID) High Speed Mass Storage Subsystem," Final Technical Report, Oct. 1997, pp. 1-211.
Lin, Jessica, "Finding Motifs in Time Series," SIGKDD'02 Jul. 23-26, 2002, 11 pages, Edmonton, Alberta, Canada.
Linthicum, David, "VM Import could be a game changer for hybrid clouds", InfoWorld, Dec. 23, 2010, 4 pages.

(56) References Cited

OTHER PUBLICATIONS

Long, Abraham Jr., "Modeling the Reliability of RAID Sets," Dell Power Solutions, May 2008, 4 pages.
Ma, Ao, et al., "RAIDShield: Characterizing, Monitoring, and Proactively Protecting Against Disk Failures," Fast '15, 13th USENIX Conference on File and Storage Technologies, Feb. 16-19, 2015, 17 pages, Santa Clara, California, U.S.A.
Mahalingam, M., et al., "Virtual eXtensible Local Area Network (VXLAN): A Framework for Overlaying Virtualized Layer 2 Networks over Layer 3 Networks," Independent Submission, RFC 7348, Aug. 2014, 22 pages; http://www.hjp.at/doc/rfc/rfc7348.html.
McQuerry, Steve, "Cisco UCS M-Series Modular Servers for Cloud-Scale Workloads," White Paper, Cisco Systems, Inc., Sep. 2014, 11 pages.
Monia, Charles, et al., IFCP—A Protocol for Internet Fibre Channel Networking, draft-monia-ips-ifcp-00.txt, Dec. 12, 2000, 6 pages.
Mueen, Abdullah, et al., "Online Discovery and Maintenance of Time Series Motifs," KDD'10 the 16th ACM SIGKDD International Conference on Knowledge Discovery and Data Mining, Jul. 25-28, 2010, 10 pages, Washington, DC, U.S.A.
Muglia, Bob, "Decoding SDN," Jan. 14, 2013, Juniper Networks, pp. 1-7, http://forums.juniper.net/t5/The-New-Network/Decoding-SDN/ba-p/174651.
Murray, Joseph F., et al., "Machine Learning Methods for Predicting Failures in Hard Drives: A Multiple-Instance Application," Journal of Machine Learning Research 6 (2005), pp. 783-816; May 2005, 34 pages.
Nelson, Mark, "File Verification Using CRC," Dr. Dobb's Journal, May 1, 1992, pp. 1-18, XP055130883.
Pace, Alberto, "Technologies for Large Data Management in Scientific Computing," International Journal of Modern Physics C., vol. 25, No. 2, Feb. 2014, 72 pages.
Pinheiro, Eduardo, et al., "Failure Trends in a Large Disk Drive Population," FAST '07, 5th USENIX Conference on File and Storage Technologies, Feb. 13-16, 2007, 13 pages, San Jose, California, U.S.A.
Raginsky, Maxim, et al., "Sequential Anomaly Detection in the Presence of Noise and Limited Feedback," arXiv:0911.2904v4 [cs.LG] Mar. 13, 2012, 19 pages.
Saidi, Ali G., et al., "Performance Validation of Network-Intensive Workloads on a Full-System Simulator," Interaction between Operating System and Computer Architecture Workshop, (IOSCA 2005), Austin, Texas, Oct. 2005, 10 pages.
Sajassi, A., et al., "BGP MPLS Based Ethernet VPN," Network Working Group, Oct. 18, 2014, 52 pages.
Sajassi, Ali, et al., "A Network Virtualization Overlay Solution using EVPN," L2VPN Workgroup, Nov. 10, 2014, 24 pages; http://tools.ietf.org/pdf/draft-ietf-bess-evpn-overlay-00.pdf.
Sajassi, Ali, et al., "Integrated Routing and Bridging in EVPN," L2VPN Workgroup, Nov. 11, 2014, 26 pages; http://tools.ietf.org/pdf/draft-ietf-bess-evpn-inter-subnet-forwarding-00.pdf.
Schroeder, Bianca, et al., "Disk failures in the real world: What does an MTTF of 1,000,000 hours mean to you?" FAST '07: 5th USENIX Conference on File and Storage Technologies, Feb. 13-16, 2007, 16 pages, San Jose, California, U.S.A.
Shue, David, et al., "Performance Isolation and Fairness for Multi-Tenant Cloud Storage," USENIX Association, 10th USENIX Symposium on Operating Systems Design Implementation (OSDI '12), 2012, 14 pages; https://www.usenix.org/system/files/conference/osdi12/osdi12-final-215.pdf.
Staimer, Marc, "Inside Cisco Systems' Unified Computing System," Dragon Slayer Consulting, Jul. 2009, 5 pages.
Swami, Vijay, "Simplifying SAN Management for VMWare Boot from SAN, Utilizing Cisco UCS and Palo," posted May 31, 2011, 6 pages.
Tate, Jon, et al., "Introduction to Storage Area Networks and System Networking," Dec. 2017, 302 pages, ibm.com/redbooks.
Vuppala, Vibhavasu, et al., "Layer-3 Switching Using Virtual Network Ports," Computer Communications and Networks, 1999, Proceedings, Eight International Conference in Boston, MA, USA, Oct. 11-13, 1999, Piscataway, NJ, USA, IEEE, ISBN: 0-7803-5794-9, pp. 642-648.
Wang, Feng, et al. "OBFS: A File System for Object-Based Storage Devices," Storage System Research Center, MSST. vol. 4., Apr. 2004, 18 pages.
Weil, Sage A., "CEPH: Reliable, Scalable, and High-Performance Distributed Storage," Dec. 2007, 239 pages, University of California, Santa Cruz.
Weil, Sage A., et al. "CRUSH: Controlled, Scalable, Decentralized Placement of Replicated Data." Proceedings of the 2006 ACM/IEEE conference on Supercomputing. ACM, Nov. 11, 2006, 12 pages.
Weil, Sage A., et al. "Ceph: A Scalable, High-performance Distributed File System," Proceedings of the 7th symposium on Operating systems design and implementation. USENIX Association, Nov. 6, 2006, 14 pages.
Wu, Joel, et al., "The Design, and Implementation of AQuA: An Adaptive Quality of Service Aware Object-Based Storage Device," Department of Computer Science, MSST, May 17, 2006, 25 pages; http://storageconference.us/2006/Presentations/30Wu.pdf.
Xue, Chendi, et al. "A Standard framework for Ceph performance profiling with latency breakdown," CEPH, Jun. 30, 2015, 3 pages.
Zhou, Zihan, et al., "Stable Principal Component Pursuit," arXiv:1001.2363v1 [cs.IT], Jan. 14, 2010, 5 pages.
Zhu, Yunfeng, et al., "A Cost-based Heterogeneous Recovery Scheme for Distributed Storage Systems with RAID-6 Codes," University of Science & Technology of China, 2012, 12 pages.
Aweya, James, et al., "Multi-level active queue management with dynamic thresholds," Elsevier, Computer Communications 25 (2002) pp. 756-771.
Petersen, Chris, "Introducing Lightning: A flexible NVMe JBOF," Mar. 9, 2016, 6 pages.

* cited by examiner

BID/ASK PROTOCOL IN SCALE-OUT NVME STORAGE

CROSS-REFERENCE TO RELATED APPLICATION

This application claims the benefit of priority under 35 U.S.C. § 119(e) to U.S. Provisional Application Ser. No. 62/192,966, entitled "APPARATUS, SYSTEM, AND METHOD FOR BID/ASK PROTOCOL IN SCALE-OUT NVME STORAGE," filed Jul. 15, 2015, which is hereby incorporated by reference in its entirety.

TECHNICAL FIELD

This disclosure relates in general to the field of communications and, more particularly, to embodiments for implementing a bid/ask protocol in scale-out non-volatile memory express ("NVMe") storage.

BACKGROUND

Deterministic storage systems are ubiquitous in modern data centers supporting big-data, high-performance computing, database, and other common applications. Based on the linear relationship between host (i.e., "initiator") and target, it is necessary to architect entire systems of Reliability, Availability, and Security ("RAS") to ensure the integrity of that relationship. This has resulted in the limited command-and-control architectures in data centers today. Advances in non-volatile memory ("NVM") systems have dramatically altered the nature of this relationship, enabling transference from one-to-one, deterministic linear systems to non-linear, dynamic adaptive systems. Fundamental changes in the atomic relationship have given rise to embedded intelligence in the end devices, allowing for greater flexibility and applicability in massive scale-out architectures; however, current storage protocols are not able to take advantage of this technological shift and therefore limit the scalability of such systems.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
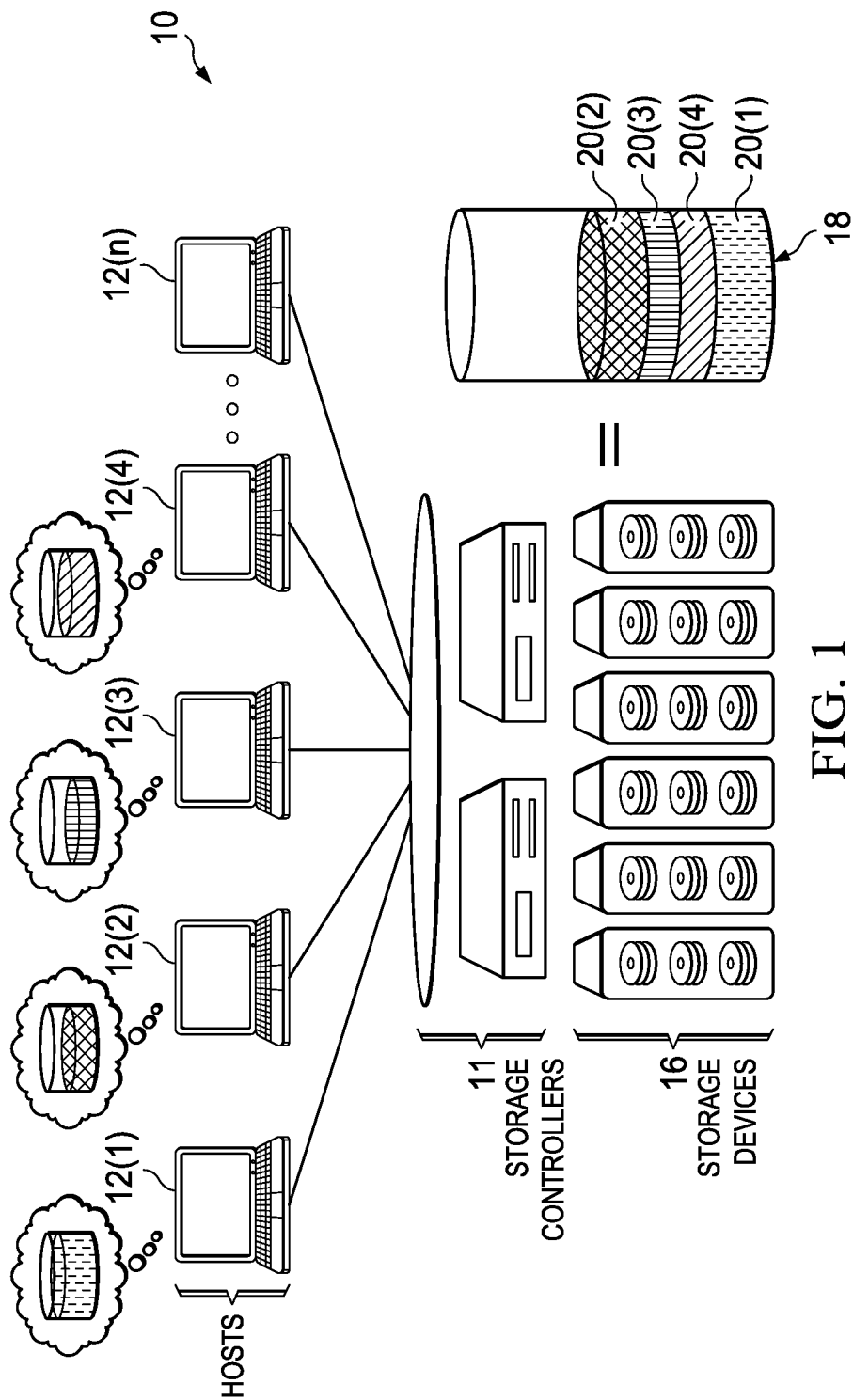
FIG. 1 is a simplified block diagram of a storage system environment in which embodiments of a bid/ask protocol in scale-out NVMe storage in accordance with features described herein may be implemented.

A method is provided in one example embodiment and includes receiving by first network device a request for storage resources from a second network device; evaluating a willingness of the first network device to provide the requested storage resources and assigning a willingness score based on the evaluating; determining whether the willingness score is greater than a minimum value; and if the willingness score is greater than the minimum value, providing a response to the request from the first network device to the second network device, wherein the response comprises a bid by the first network device to provide the requested storage resources to the second network device.

EXAMPLE EMBODIMENTS

One purpose of example embodiments of the disclosure is to define a protocol that includes standard command set and bid/ask algorithm for use in a non-linear scalable system, such as an interconnected NVMe storage cluster subsystem. The distributed nature of the protocol described herein is unique and significantly contributes to its scalability. In particular, the protocol described herein is far more distributed than current solutions, thereby increasing its scalability.

NVMe is a logical device interface specification for enabling access to non-volatile storage media attached via PCI Express ("PCIe") bus. The "non-volatile memory" to which "NVM" refers is commonly flash memory in the form of solid state drives ("SDDs"). NVMe capitalizes on low latency and internal parallelism of flash memory-based storage devices and mirrors the parallelism of current CPUs, platforms, and applications. In particular, NVMe enables full utilization by host hardware and software of parallelism in modern SSDs. As a result, NVMe reduces I/O overhead and facilitates improved performance in comparison to previous logical device interfaces. NVMe was developed specifically for SSDs by a consortium of SSD vendors. As with Small Computer System Interface ("SCSI") and Serial ATA ("SATA"), NVMe is designed to take advantage of the unique properties of pipeline-rich, random access memory-based storage. A goal of NVMe is to capitalize on the potential of PCIe SSDs now and in the future, as well as to standardize the PCIe SSD interface.

It will be noted that NVMe is a streamlined interface specification, consisting of a mere thirteen required commands (compared to 400+ for SCSI) and accommodating $2^{32}$ queues and $2^{32}$ commands-per-queue; the increase in capability afforded by NVMe is significant. Perhaps even more significant than the numerical advantages afforded by the protocol proposed and described herein is the paradigm shift in host-target relationship that it enables. Specifically, instead of a one-to-one relationship, the protocol supports a one-to-many relationship that opens up a wide range of possibilities, all of which far exceed the capabilities of any command-and-control architecture.

For example, in accordance with features described herein, the protocol enables operating systems ("OSes") to be written to accommodate multi-location non-volatile memory cells in non-deterministic locations (e.g., across multiple drive units, nodes, etc.) and enables applications for high-performance computing to exponentially increase efficiency via embarrassingly parallel storage access. Additionally, embodiments herein may enable storage devices to eliminate SCSI-related scaffolding that hinders optimal efficiency for host-target communication.

Turning to certain details associated with example architectures, for massively scalable systems, maintaining symmetry creates an ever-decreasing rate of return for efficiency. Path efficiency is calculated to avoid downtime or accommodate problems, rather than for system applicability. Forcing data to a volume that may be undergoing maintenance or even rebuilding necessitates performance degradation and synchronicity issues. Additionally, data that is distributed across massively scalable systems should not necessarily be distributed symmetrically. At mathematically large volumes of I/O, scalable systems should be able to accommodate data usage fluctuations dynamically and adaptively. This means that pre-deterministic data I/O flows are contrary to an optimal storage solution.

Typical large scale storage solutions rely on a central point of intelligence to allocate storage resources to compute nodes. Using a central point of intelligence can limit scalability as a data center grows. Such a configuration also presents a number of challenges with respect to availability, necessitating use of techniques such as hot standby backups, state sharing and synchronization, etc.

One aspect of embodiments described herein is a protocol that fully distributes the process of allocating, or provisioning, storage resources to requestor nodes, thus eliminating the need for a central point of intelligence for doing so. Autonomy is created within the requestor nodes to identify their storage needs and within the storage nodes to identify their ability and willingness to accommodate storage needs. In this manner, large systems with thousands (or hundreds of thousands) of end-points are not incorrectly or inefficiently hampered by pre-deterministic policies or behavior.

One possible misconception with regard to large scale storage systems is that storage clusters must constantly load-balance to a state of symmetrical equilibrium. The reason for this is that in linear-based systems, metadata parity across scale-out systems is critical for fault tolerance, or the needs that RAID requires for rebuilding mechanics. In a non-linear asymmetrical cluster, however, this is not the case. Storage memory is not abstracted as a volume to be presented via a host, as it is in SCSI-based systems. Instead, NVM storage is directly accessed via NVMe from the initiator. Each atomic unit of NVM namespace is wholly owned by its corresponding initiator namespace, which eliminates the necessity for storage affinities on any one particular storage node. From the initiator's perspective, it owns a storage namespace that is directly addressable and accessible. It does not matter the number or location of the devices (or nodes) where those flash memory pages reside.

As a result, each deployed storage cluster creates its own autopoeisis. That is, no two storage cluster data layouts will look exactly the same, but rather create a dynamic pattern of data placement that is uniquely optimized to each system. By following some very simple rules, data integrity is maintained through judicious multipathing and namespace management, coupled with recommended snapshot/cloning/backup procedures. The practical effect is that data is placed upon the most efficient and appropriate storage node as it becomes available, not pre-deterministically. Some nodes may be responsible for the bulk of namespace pages, where others may have none (depending upon their willingness at instantiation). Over time, the storage will necessarily be allocated asymmetrically and non-linearly across the cluster, with no greater risk to reliability, availability, or security.

To accomplish this, a limited amount of agency is granted to the storage nodes (or "targets") themselves. The fundamental concept is that the storage node maintains a self-awareness of its status, which may include (but is not limited to) parameters such as: (1) bandwidth; (2) capacity; (3) namespace management; (4) memory health; (5) diagnostic scheduling; (6) feature functionality; and (7) existing traffic. The parameters are used to create a "willingness score" for the storage node that is, in turn, used by the node to "bid" for services.

At the other end, devices that require services of a storage node (hereinafter "initiators" or "requestors") will submit a request, or "ask" detailing storage needs of the initiator. In many cases, the requestor will be a compute node; however, in other cases, the requestor may be another storage node that may require snapshotting capabilities, for example.

When a new node that is added to a storage cluster has completed successful self-diagnosis, it is automatically at its highest "willingness" state. It listens on a known network address for "asks" from requestors and responds with an appropriate willingness score. The initiator then chooses the respondent(s) with the most advantageous willingness score and begins negotiation for namespace management.

In one embodiment, an initiator has two namespaces, designated A and B, which is similar to common multipathing notions in deterministic storage networks such as Fibre Channel. However, traditional storage environments terminate A and B traffic to the same storage device, and software on the storage array manages storage traffic for final I/O allocation due to the fact that the 1-to-1 relationship between host and target must be maintained. In contrast, in accordance with features of embodiments described herein, NVMe traffic may not be collated onto the same device. On the contrary, it is critical for high availability ("HA") that Namespace A sequences are not stored at the same storage node as Namespace B sequences. In a best practice example, I/O sequences 1, 2, 3 would never reside on the same nodes for A as for B, even if sequences 1, 2, and 3 were spread over multiple storage nodes.

The host sends out its own "ask" to each storage node. The "ask" requests participants to submit capabilities to contribute to the distributed namespace (A or B). Each node that receives the "ask" responds with its corresponding willingness to participate, and the host aggregates and establishes address location to prepare for NVMe device registration and reservation. This bid/ask system is ongoing, but as it is only the summation of willingness parameters being communicated; it is extremely lightweight.

As noted above, conventional storage systems require some sort of central intelligence, typically in the form of a storage controller, that aggregates storage devices and then presents the available capacity to a host or series of hosts as a collective pool. The underlying storage media is unaware of the environment either at conception or during the lifetime of either the host(s) or overall environment. Provisioning of storage in such systems is generally established at inception; that is, storage controllers maintain a constant vigil on the state of the media and resulting relationships with host environments. Multiple layers of abstractions are engaged to create levels and quality of service from which rigid storage environments are sectioned according to workload requirements. Workloads that require storage capabilities outside of these initial configurations require separate, special-purpose storage environments to meet performance or capacity needs.

FIG. 1 depicts a conventional storage system 10 including storage controllers 11 for performing storage provisioning. As shown in FIG. 1, the system 10 includes a numerous hosts 12(1)-12(n) connected to storage controllers 11, which collectively manage an array of storage devices 16. The storage controllers 11 present the storage devices 16 to each of the hosts as a single collective pool of storage 18. Each of the hosts 12 may be allocated, or provisioned, a portion of the storage 18 by the controllers 11 in a conventional manner. For example, as shown in FIG. 1, host 12(1) is provisioned a portion 20(1) of storage 18, host 12(2) is provisioned a portion 20(2) of storage 18, host 12(3) is provisioned a portion 20(3) of storage 18, and host 12(4) is provisioned a portion 20(4) of storage 18.

In this paradigm of storage provisioning, which is ubiquitous in modern data centers, the constraints of the storage controllers 14 severely restrict the potential for the storage environments to scale for several reasons. First, all storage media is treated equally at its lowest common denominator. Advanced intelligence capabilities embedded in the media itself are whitewashed through the process of provisioning through the storage controllers, which mandates homogeneity at the cost of advanced capabilities. Even "hybrid" systems, which create separate hardware or software controller capabilities based upon performance discrepancies between spinning disk drives and solid state drives, must aggregate to their corresponding lowest common denominator. Second, storage controllers are limited in their management capabilities due to finite memory, bandwidth, and performance. This limitation has spawned the dichotomy of "scale-up" (i.e., adding additional drives to the maximum manageable capability for capacity scale) versus "scale-out" (i.e., adding additional controllers to the maximum manageable configuration for synchronization across platforms).

Third, storage controllers frequently restrict corresponding hosts to limited subsets of storage access methods. In other words, storage arrays that provide block access do not provide object storage provisioning or file storage provisioning, or vice-versa. Fourth, storage controllers require static configuration parameters that cannot change over time. Provisioning models must be anticipated well in advance of actual usage patterns, which leads to inefficient allocation of storage resources. Moreover, non-volatile memory storage (such as NAND Flash) require maintenance routines which, without an awareness of dynamic storage access conditions, can significantly deteriorate workflow and application performance. Finally, data structures within and across storage controllers (for scale-out systems) require massive synchronization and load-balancing efforts at scale. Each component is treated as an equivalent building-block and distributed systems become less efficient as scale increases.

To accommodate these limitations, storage environments involve multiple layers of abstraction to mitigate management, capacity, performance, bandwidth, and use case differences, resulting in entire ecosystems of support to justify "unaware" storage media.

Advances in non-volatile memory (NVM) media and protocols have improved the embedded intelligence quotient of storage itself. This embedded intelligence has opened up additional steps towards self-aware storage systems, both local (i.e., embedded on the host) and remote (e.g., arrays, appliances, etc.). The advantage of this invention addresses, ameliorates, or eliminates several of the limitations of existing storage technology that relies on storage controllers. In one aspect, embodiments described herein treat storage (both local and remote) as a resource that has individual characteristics and properties, rather than part of a monolithic, homogeneous pool. Additionally, embodiments dynamically adapt to storage ecosystem conditions over time, directly interact with hosts to coordinate maintenance windows, and enable heterogeneous storage environments, even within singular host environments (e.g., single-server storage memory). Moreover, embodiments enable polling of neighboring systems for secondary and tertiary storage features and functionality (e.g., snapshotting, cloning, capacity expansion, etc.), permit the creation of global, unified namespaces for large-scale host-sharing applications (e.g., in-memory databases), and create storage environment based upon the highest common denominator, accommodating faster and more feature-rich storage technologies over time. Embodiments may also enable automatic Quality of Service (QoS) functionality, based upon workload requirements and media capabilities, instead of performance throttling, eliminate the requirement for system-wide load-balancing, and create fine-grained, granular control over storage requirements, per-host instance/environment. Finally, embodiments may enable operating systems to be written to accommodate multi-location non-volatile memory cells in non-deterministic locations (i.e., across multiple drive units, nodes, etc.) and enable applications for high-performance computing to exponentially increase efficiency via embarrassingly parallel storage access.

Data center environments often use the term "initiator" to refer to a host, and "target" to refer to the host's corresponding storage entity. Because these terms are well-understood, and because embodiments of the bid/ask protocol described herein do not restrict the roles and functions to these specific locations, the following definitions will be used. A "requestor" is any data center entity or node that has a specific need for storage functionality. This can include, but may not be limited to, capacity, bandwidth, encryption, or other storage-related functions. These storage functions will have parameter characteristics, such as latency, jitter, geographic dispersal, etc. A "responder" is any data center entity that has a set of storage resources and the ability to respond to a request for those resources received from a requestor. Requestor and responder are functional roles and, as such, may exist within the same entity (e.g., server, storage, even networking equipment), or external to that entity (e.g. appliances, arrays, distributed memory networks). An "ask" is a request by a requestor for storage resources that includes a set of parameters defining the resources needed. A "bid" is a response by a responder to an ask that includes a willingness score that identifies the responders capability to fulfill the parameters of the ask. A "willingness score" is the self-assessment of a responder to satisfy the parameters of the ask. This assessment will necessarily change over time, raising or lowering the responder's eligibility to participate in a storage relationship requested by a requestor.

Figure 2:
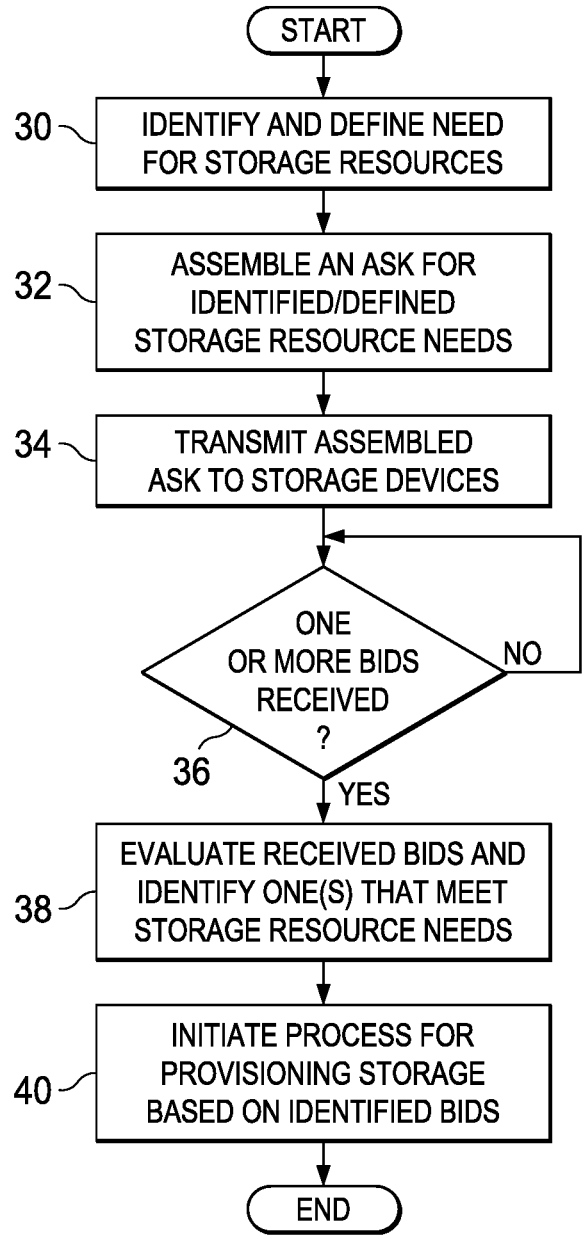
FIG. 2 is a flowchart illustrating operations that may be performed by a requestor for implementing a bid/ask protocol in scale-out NVMe storage in accordance with features described herein.

FIG. 2 is a flowchart illustrating a technique for implementing a bid/ask protocol in scale-out NVMe storage in accordance with embodiments described herein from the perspective of a requestor. In step 30, the requestor identifies a need for storage resources. This identification may be prompted at the inception of a workload/application or at the determination of a need to augment dwindling existing resources. In step 32, the requestor assembles an ask for the identified storage resources need. Successful criteria for satisfaction of that need may or may not be included in the ask. "Heavyweight" asks will include satisfaction criteria, which will enable responders to determine whether or not to provide a bid for the storage resources. In large-scale deployments, heavyweight asks may be preferable in order to reduce the overall network impact of bids. In contrast, "lightweight" asks will not include satisfaction criteria. When the requestor uses a lightweight ask, the requestor will subsequently aggregate bids and select appropriate responder(s), ignoring all other bids. Lightweight asks permit requestors to use "best effort" selection criteria given available resources.

In step 34, the requestor transmits the assembled ask on a known network address, on which storage cluster nodes (i.e., storage devices) are listening. In step 36, the requestor receives bids from the storage device(s) listening on the address. As previously noted, the number of bids received may be related to whether the ask was a heavyweight ask (in which case fewer bids will likely be received) or a lightweight ask (in which case many bids may be received). In step 38, the requestor evaluates the received bids and accepts the one or more that will meet the storage resource needs of the requestor. In step 40, the requestor initiates the normal processes for provisioning the storage resources that were identified based on the evaluating performed in step 38.

Figure 3:
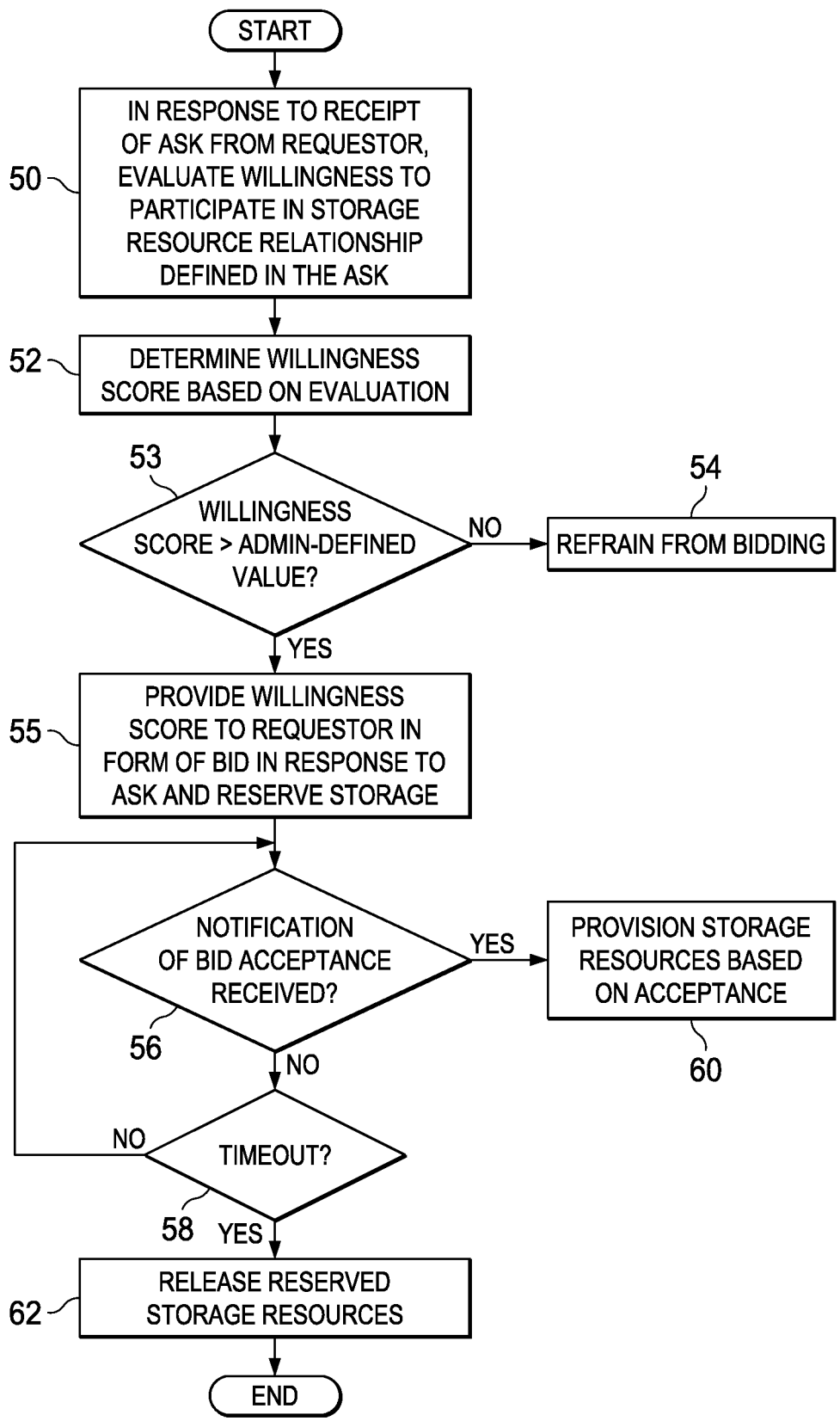
FIG. 3 is a flowchart illustrating operations that may be performed by a responder for implementing a bid/ask protocol in scale-out NVMe storage in accordance with features described herein.

FIG. 3 is a flowchart illustrating a technique for implementing a bid/ask protocol in scale-out NVMe storage in accordance with embodiments described herein from the perspective of a responder. In step 50, upon receipt of an ask from a requestor on the known network address, the responder evaluates its willingness to participate in a storage relationship requested by a requestor. As noted above, in this regard, it is understood that the storage node maintains a self-awareness of its status, which may include (but is not limited to) parameters such as: (1) bandwidth; (2) capacity; (3) namespace management; (4) memory health; (5) diagnostic scheduling; (6) feature functionality; and (7) existing traffic. The storage node evaluates some or all of these parameters and/or at the time an ask is received to develop a willingness score (step 52). In step 53 a determination is made whether the willingness score is greater than administratively defined value. If not, execution proceeds to step 54, in which the requestor refrains from bidding. For example, responders undergoing severe diagnostic issues may self-assign a willingness score of zero (0) so as to prevent them from bidding in response to an ask. If it is determined in step 53 that the willingness score is greater than the administratively defined value, execution proceeds to step 55. In step 55, the responder provides the willingness score to the requestor in the form of a bid. In accordance with features of embodiments described herein, the responder will reserve storage resources corresponding to bid values until it receives notification that its bid has been accepted (step 56) or a timeout occurs (step 58). Additionally, the responders' willingness score in response to subsequent asks from requestors will be adjusted to accommodate a presumed acceptance of the bid by the requestor, so as not to over-extend available resources.

If the responder receives notification of acceptance of its bid in step 56, execution will proceed to step 60. In step 60, storage resources are provisioned. This may include, but is not limited to, NVMe namespace initiation, scatter-gather list creation, erasure/network coding instantiation, archiving, cloning, backup and/or recovery, etc. If a timeout occurs in step 58, meaning that the responder's bid was not accepted, execution proceeds to step 62, in which the previously reserved resources are released for reassignment, resulting in a readjustment of the responder's willingness score in response to subsequent asks from requestors.

It will be noted that in certain embodiments, a single device may function as both requestor and responder, submitting a bid in response to its own ask. For example, a storage node with a faulty NVM location may recognize a need for migration to a healthier device. Given that NVM media is independent, another suitable location may exist on the same device. To that end, the storage node could conceivably under certain circumstances bid upon its own ask. In fact, it is anticipated that many typical operations will be intra-device for routine maintenance tasks.

In example implementations, at least some portions of the activities related to the system for implementing a bid/ask protocol in scale-out NVMe storage outlined herein may be implemented in software in, for example, a server, a router, etc. In some embodiments, this software could be received or downloaded from a web server, provided on computer-readable media, or configured by a manufacturer of a particular element in order to provide this system in accordance with features of embodiments described herein. In some embodiments, one or more of these features may be implemented in hardware, provided external to these elements, or consolidated in any appropriate manner to achieve the intended functionality.

Figure 4:
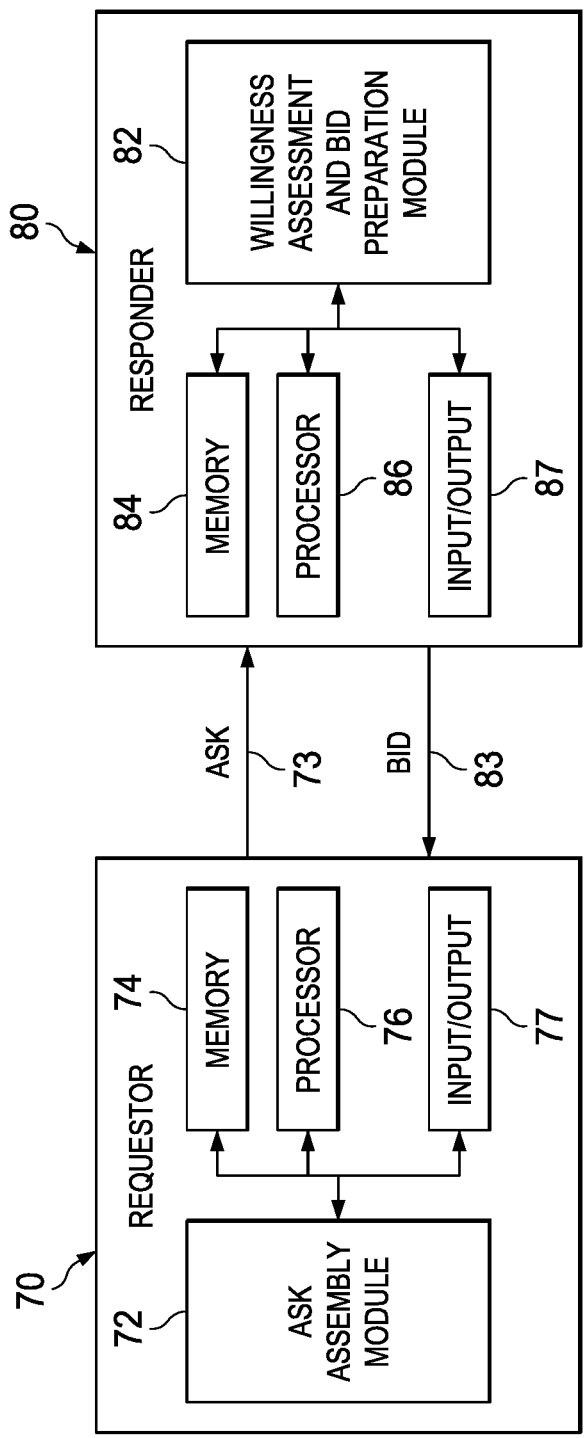
FIG. 4 is a simplified block diagram of requestor and responder nodes that may be implemented in a storage system environment in which embodiments of a bid/ask protocol in scale-out NVMe storage in accordance with features described herein may be implemented.

For example, referring to FIG. 4, a requestor 70 may include an ask assembly module 72, which comprises software embodied in one or more tangible media for facilitating the activities described herein, including assembling an ask 73. In particular, the ask assembly module 72 comprises software for facilitating the processes illustrated in and described with reference to FIGS. 2 and 3. The requestor 70 may also include a memory device 74 for storing information to be used in achieving the functions as outlined herein. Additionally, the requestor 70 may include a processor 76 that is capable of executing software or an algorithm (such as embodied in module 72) to perform the functions as discussed in this Specification. The requestor 70 may also include various I/O 77 necessary for performing functions described herein.

The ask 73 is conveyed to at least one responder, represented in FIG. 4 by a responder 80, which may include a willingness assessment and bid preparation module 82 comprising software embodied in one or more tangible media for facilitating the activities described herein, including assessing the willingness of the responder 80 to provide storage resources in response to a received ask and preparing a bid 83 to be returned to the requestor 70. In particular, the wiliness assessment and bid preparation module 82 comprises software for facilitating the processes illustrated in and described with reference to FIGS. 2 and 3. The responder 80 may also include a memory device 84 for storing information to be used in achieving the functions as outlined herein. Additionally, the responder 80 may include a processor 86 that is capable of executing software or an algorithm (such as embodied in module 82) to perform the functions as discussed in this Specification. The responder 80 may also include various I/O 87 necessary for performing functions described herein.

The following are examples of use of embodiments described herein. The examples are representative only and are not meant to comprise an exhaustive listing of use cases. In one example, embodiments may be used to implement host-to-target storage provisioning. In this situation, a host with a predetermined (possibly policy-driven) criteria requirement for storage resources generates a request, or an "ask." This request is sent out via a known multicast address to end devices with a determined origination timestamp. All storage devices within a policy-specified time period are invited to bid for servicing the storage request, or ask. Storage devices conditionally reserve the resources (e.g., capacity, bandwidth, etc.) and submit a bid for providing the resources. The host evaluates all submissions and identifies winning bidders of selection. Non-winning bidders are not notified and after a policy-defined timeout period will reclaim the reserved resources for other subsequent requests. If the host does not receive enough bids for the requested resources, the host can timeout the request (and all bidding devices wait until their timeout period concludes) or submit reduced-requirement requests. These subsequent requests can be initiated via an administrator or by automated policy.

In another example, embodiments may be used to implement intratarget storage provisioning. In this situation, a storage target constantly monitors its health and capabilities. If an internal component fails, the storage target may then seek out additional storage resources elsewhere. These new resources may exist within the same storage target chassis (e.g., in large storage systems there may be independent NVMe controllers that have domain over their own media components). A storage device with responsibility for media resources may need to find substitute capacity and/or bandwidth in certain circumstances, e.g., component failure. At this point, the subsystem would send out a request for storage resources, which could in turn be physically housed in the same device. To that end, the storage device could respond (and bid) for its own subsequent storage resource requirements.

In yet another example, embodiments may be used to implement snapshot storage provisioning. In particular, via manual or policy-based snapshots, data stores that require a snapshot "recovery point objective" ("RPO") may initiate host-unaware storage-to-storage copying of data as NVMe namespaces are replicated at specific intervals. For instance, NVMe namespaces and media maps (i.e., metadata) could be duplicated as snapshot entities, and the written data could be re-tagged as belonging to the snapshot namespace instead of marked for deletion. Normal performance penalties for snapshots are avoided as the host is independent of the re-tagging process. However, as the need for more storage media is required when snapshots accumulate, there is a need for additional storage capacity. The storage device could request more storage media using the bid/ask method "behind the scenes" with the host performance never being affected.

In yet another example, embodiments may be used to implement remote disaster recovery storage provisioning. Remote offices or Business Continuity/Disaster Recovery situations require the ability to store copies of data off-site. The bid/ask protocol described herein could be used as either a "push" solution, in which the local data center requests remote capacity, or a "pull" solution, in which the remote data center requests the latest updates for recent data stores. Data may be transmitted across long distance by any traditional storage distance solution, with or without erasure coding techniques re-assembling the data constructs at the remote location.

Although the embodiments are described with reference to a certain type of communications network, it will be recognized that the techniques are equally applicable to other network technologies. In one example implementation, various devices involved in implementing the embodiments described herein can include software for achieving the described functions. For example, as shown in FIG. 4, the nodes may be implemented using one or more computer devices comprising software embodied in one or more tangible media for facilitating the activities described herein. The computer device for implementing the transmitter and receiver elements may also include a memory device (or memory element) for storing information to be used in achieving the functions as outlined herein. Additionally, the computer device for implementing the transmitter and receiver elements may include a processor that is capable of executing software or an algorithm to perform the functions as discussed in this Specification, including but not limited to the functions illustrated in and described with reference to FIGS. 2 and 3. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIGS. 2 and 3 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 2 and 3. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Figure 5:
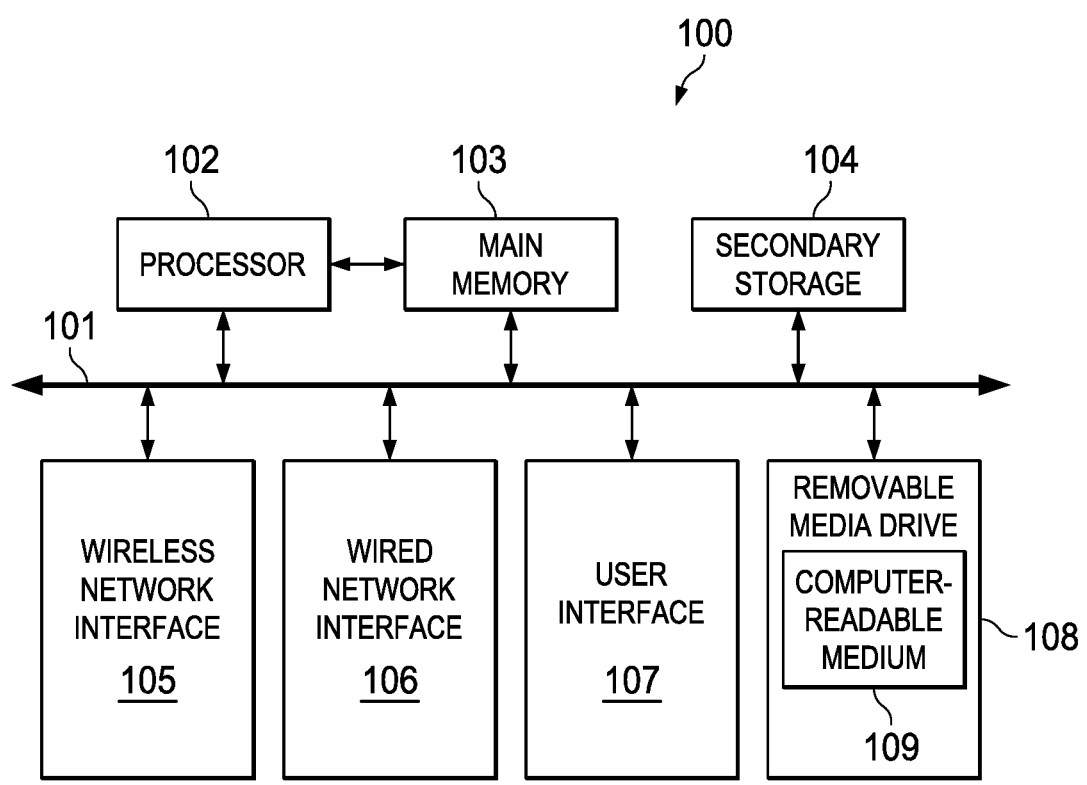
FIG. 5 is a simplified block diagram of a machine comprising an element of the storage system environment of FIG. 1 for implementing a technique for mitigation of uplink interference within a heterogeneous wireless communications network in accordance with embodiments described herein.

Turning to FIG. 5, FIG. 5 illustrates a simplified block diagram of an example machine (or apparatus) 100, which in certain embodiments may a host or a storage device, such as hosts 12(1)-12(n) and storage devices 16 as illustrated in FIG. 1, that may be implemented a system in accordance with features of embodiments described herein. The example machine 100 corresponds to network elements and computing devices that may be deployed in system 10, including, for example, storage devices 16 and hosts 12(1)-12(n). In particular, FIG. 5 illustrates a block diagram representation of an example form of a machine within which software and hardware cause machine 100 to perform any one or more of the activities or operations discussed herein. As shown in FIG. 5, machine 100 may include a processor 102, a main memory 103, secondary storage 104, a wireless network interface 105, a wired network interface 106, a user interface 107, and a removable media drive 108 including a computer-readable medium 109. A bus 101, such as a system bus and a memory bus, may provide electronic communication between processor 102 and the memory, drives, interfaces, and other components of machine 100.

Processor 102, which may also be referred to as a central processing unit ("CPU"), can include any general or special-purpose processor capable of executing machine readable instructions and performing operations on data as instructed by the machine readable instructions. Main memory 103 may be directly accessible to processor 102 for accessing machine instructions and may be in the form of random access memory ("RAM") or any type of dynamic storage (e.g., dynamic random access memory ("DRAM")). Secondary storage 104 can be any non-volatile memory such as a hard disk, which is capable of storing electronic data including executable software files. Externally stored electronic data may be provided to computer 100 through one or more removable media drives 108, which may be configured to receive any type of external media such as compact discs ("CDs"), digital video discs ("DVDs"), flash drives, external hard drives, etc.

Wireless and wired network interfaces 105 and 106 can be provided to enable electronic communication between machine 100 and other machines, or nodes. In one example, wireless network interface 105 could include a wireless network controller ("WNIC") with suitable transmitting and receiving components, such as transceivers, for wirelessly communicating within a network. Wired network interface 106 can enable machine 100 to physically connect to a network by a wire line such as an Ethernet cable. Both wireless and wired network interfaces 105 and 106 may be configured to facilitate communications using suitable communication protocols such as, for example, Internet Protocol Suite ("TCP/IP"). Machine 100 is shown with both wireless and wired network interfaces 105 and 106 for illustrative purposes only. While one or more wireless and hardwire interfaces may be provided in machine 100, or externally connected to machine 100, only one connection option is needed to enable connection of machine 100 to a network.

A user interface 107 may be provided in some machines to allow a user to interact with the machine 100. User interface 107 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 108 represents a drive configured to receive any type of external computer-readable media (e.g., computer-readable medium 109). Instructions embodying the activities or functions described herein may be stored on one or more external computer-readable media. Additionally, such instructions may also, or alternatively, reside at least partially within a memory element (e.g., in main memory 103 or cache memory of processor 102) of machine 100 during execution, or within a non-volatile memory element (e.g., secondary storage 104) of machine 100. Accordingly, other memory elements of machine 100 also constitute computer-readable media. Thus, "computer-readable medium" is meant to include any medium that is capable of storing instructions for execution by machine 100 that cause the machine to perform any one or more of the activities disclosed herein.

Not shown in FIG. 5 is additional hardware that may be suitably coupled to processor 102 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 100 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 100 to appropriately manage the operation of the hardware components therein.

The elements, shown and/or described with reference to machine 100, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein related to techniques for enabling packet prioritization without starvation in data center networks may be implemented in software in, for example, hosts and storage devices. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

In one example implementation, hosts and storage devices are network elements or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 103, secondary storage 104, computer-readable medium 109) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 102) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of the network 10, 110, may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment 10, 110, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   maintaining, by a first network device, a self-awareness of a plurality of statuses of a plurality of parameters of the first network device;
   receiving, by the first network device, a request for storage resources from a second network device;
   developing, by the first network device, a willingness score of the first network device to provide the storage resources to the second network device, the willingness score based on at least one of the plurality of statuses of the plurality of parameters of the first network device related to the request;
   in response to the willingness score being less than a minimum value, refraining from providing a response to the request;
   in response to the willingness score being greater than the minimum value, providing, to the second network device, the response to the request including a bid by the first network device to provide the storage resources to the second network device; and
   executing, by the first network device, at least one intermediate action to allocate the storage service from the request pending receipt of an acceptance of the bid during a timeout period.

2. The method of claim 1, wherein the receiving comprises listening on a known network address for an ask with the request for storage resources.

3. The method of claim 1, wherein the plurality of parameters comprising at least two of available bandwidth, available capacity, namespace management, memory health, diagnostic scheduling, feature functionality, and current traffic volume.

4. The method of claim 1, wherein the at least one intermediate action includes decreasing the willingness score of the first network device to yield a decreased willingness score for subsequent requests to provide the storage resources.

5. The method of claim 1, further comprising:
   receiving the acceptance of the bid from the second network device; and
   provisioning the storage resources to the second network device based on the acceptance of the bid.

6. The method of claim 1, further comprising:
   releasing the storage resources when a time out of the timeout period occurs.

7. The method of claim 1, wherein the first and second network devices comprise a same network device.

8. The method of claim 1, wherein the first network device comprises a storage device.

9. One or more non-transitory tangible media having encoded thereon logic that includes code for execution and when executed by a processor is operable to perform operations comprising:
   maintaining, by a first network device, a self-awareness of a plurality of statuses of a plurality of parameters of the first network device;
   receiving, by the first network device, a request for storage resources from a second network device;
   developing, by the first network device, a willingness score of the first network device to provide the storage resources to the second network device, the willingness score based on at least one of the plurality of statuses of the plurality of parameters of the first network device related to the request;
   in response to the willingness score being less than a minimum value, refraining from providing a response to the request;
   in response to the willingness score being greater than the minimum value, providing to the second network device, the response to the request including a bid by the first network device to provide the storage resources to the second network device; and
   executing, by the first network device, at least one intermediate action to allocate the storage service from the request pending receipt of an acceptance of the bid during a timeout period.

10. The one or more e-non-transitory tangible media of claim 9, wherein the receiving comprises listening on a known network address for an ask with the request for storage resources.

11. The one or more e-non-transitory tangible media of claim 9, wherein the plurality of parameters comprising at least two of available bandwidth, available capacity, namespace management, memory health, diagnostic scheduling, feature functionality, and current traffic volume.

12. The one or more e-non-transitory tangible media of claim 9, wherein the at least one intermediate action includes decreasing the willingness score of the first network device to yield a decreased willingness score for subsequent requests to provide the storage resources.

13. The one or more e-non-transitory tangible media of claim 9, wherein the operations further comprise:
   receiving the acceptance of the bid from the second network device;
   provisioning the storage resources to the second network device based on the acceptance of the bid.

14. A first network device comprising:
   a memory element configured to store data;
   a processor operable to execute instructions associated with the data; and
   a module configured via the memory element and the processor to:
      maintain a self-awareness of a plurality of statuses of a plurality of parameters of the first network device;
      receive a request for storage resources from a second network device;
      develop a willingness score of the first network device to provide the storage resources to the second network device, the willingness score based on at least one of the plurality of statuses of the plurality of parameters of the first network device related to the request
      in response to the willingness score being less than a minimum value, refrain from providing a response to the request;
      in response to the willingness score being greater than the minimum value, provide to the second network device, the response to the request including a bid by the first network device to provide the storage resources to the second network device; and
      execute at least one intermediate action to allocated the storage service from the request pending receipt of an acceptance of the bid during a timeout period.

15. The first network device of claim 14, wherein receiving the request for the storage resources includes listening on a known network address for an ask with the request for storage resources.

16. The first network device of claim 14,
   wherein,
      the plurality of parameters includes at least two of available bandwidth, available capacity, namespace management, memory health, diagnostic scheduling, feature functionality, or current traffic volume.

17. The first network device of claim 14, wherein the at least one intermediate action includes decreasing the willingness score of the first network device to yield a decreased willingness score for subsequent requests to provide the storage resources, and reserving the storage resources.

18. The first network device of claim 14, wherein the module is further configured to:
   receive the acceptance of the bid from the second network device; and
   provision the storage resources to the second network device based on the acceptance of the bid.

\* \* \* \* \*